(12) United States Patent
Iwasaki

(10) Patent No.: US 6,914,254 B2
(45) Date of Patent: Jul. 5, 2005

(54) APPARATUS FOR MANUFACTURING EVALUATION REFERENCE TAPE

(75) Inventor: Osamu Iwasaki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 262 days.

(21) Appl. No.: 10/407,423

(22) Filed: Apr. 7, 2003

(65) Prior Publication Data

US 2003/0189776 A1 Oct. 9, 2003

Related U.S. Application Data

(62) Division of application No. 09/580,544, filed on May 30, 2000, now Pat. No. 6,661,610.

(30) Foreign Application Priority Data

May 28, 1999 (JP) ............................................ 11-150013
Jun. 15, 1999 (JP) ............................................ 11-168118
Jul. 28, 1999 (JP) ............................................ 11-213302

(51) Int. Cl.$^7$ ............................ G01N 21/86; G11B 5/78
(52) U.S. Cl. ................ 250/559.01; 360/134; 369/13.41
(58) Field of Search ....................... 250/559.01, 559.02, 250/559.1, 559.4, 559.44, 223 R, 201.5; 360/25, 131, 134, 137; 369/13.35, 13.37, 13.38, 13.41

(56) References Cited

U.S. PATENT DOCUMENTS 5,363,267 A   11/1994   Fang
6,103,365 A   8/2000   Ishii et al.
6,429,411 B1   8/2002   Iwasaki et al.
6,610,610 B2 *   8/2003   Zahorik et al. ............. 438/745

FOREIGN PATENT DOCUMENTS

JP   52049004 A   4/1977
JP   60-177413 A   9/1985
JP   64-78433 A   3/1989

* cited by examiner

Primary Examiner—Kevin Pyo
(74) Attorney, Agent, or Firm—Sughrue Mion, PLLC

(57) ABSTRACT

The evaluation reference tape includes at least one recess formed on a magnetic recording layer of a magnetic tape by processing the magnetic recording layer. In the method and apparatus for manufacturing the magnetic recording layer, at least one recess is formed on the magnetic recording layer of the magnetic tape by a laser beam or laser beams in a visible region, an ultraviolet region or both which is incident on the magnetic recording layer of the magnetic tape while the magnetic tape is transported in the longitudinal direction. The evaluation reference tape can perform sensitivity correction of a dropout testing apparatus in accordance with a depth or size of a defect of the magnetic tape and evaluation of the recording/replaying system of the magnetic tape without destroying the evaluation reference tape itself. The method and apparatus can efficiently manufacture the evaluation reference tape.

1 Claim, 19 Drawing Sheets

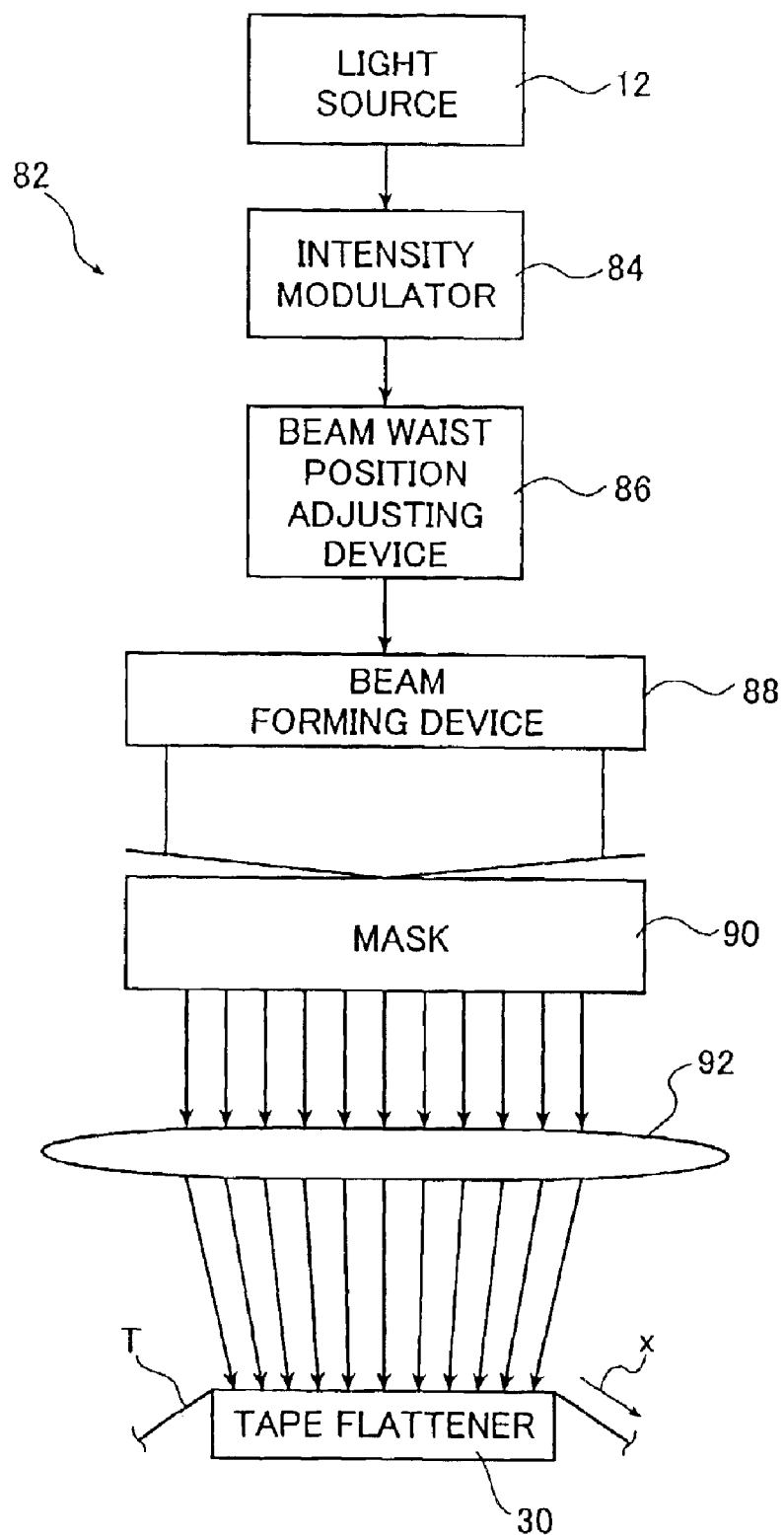

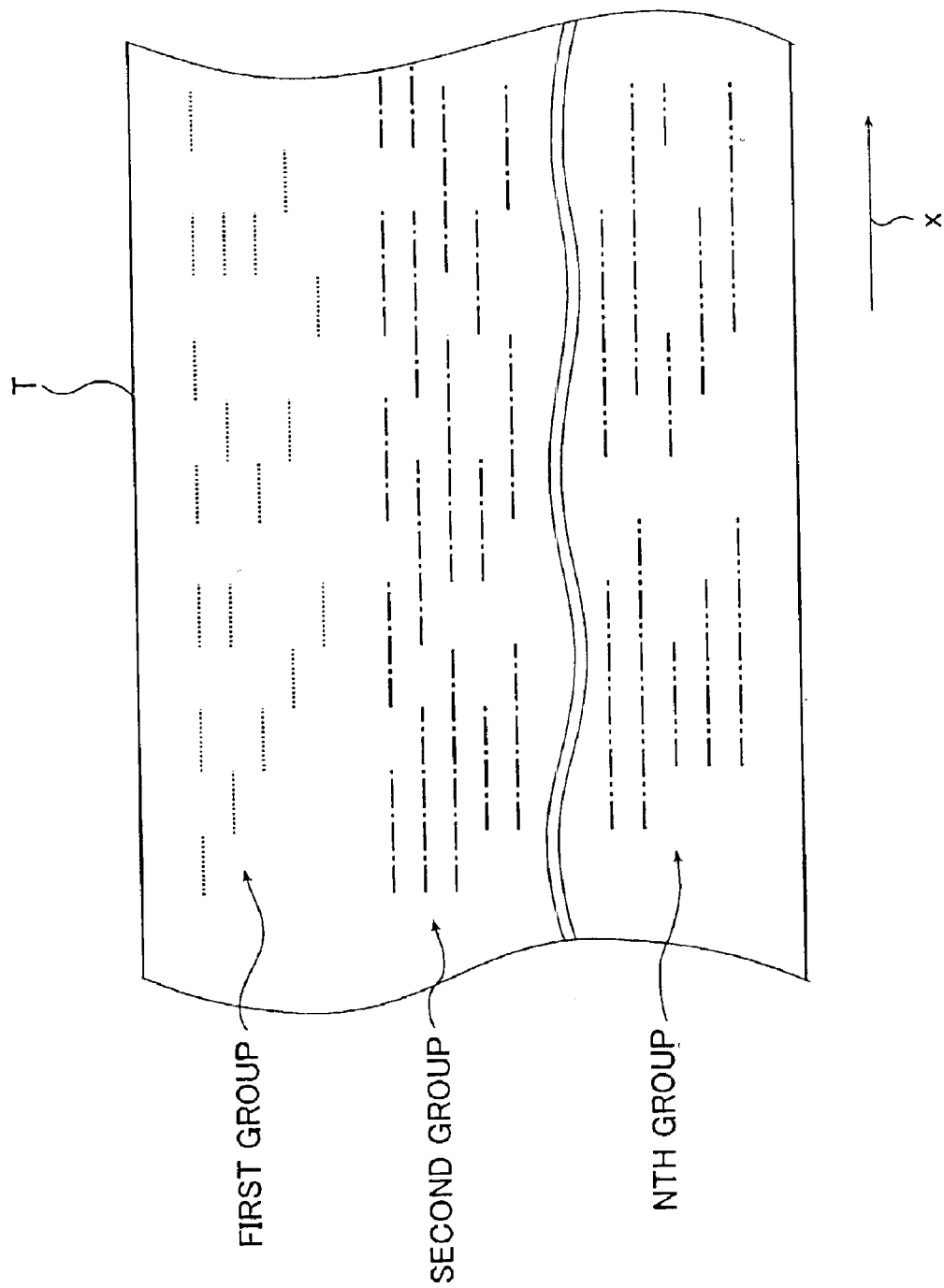

APPARATUS FOR MANUFACTURING EVALUATION REFERENCE TAPE

This is a divisional of application Ser. No. 09/580,544, filed May 30, 2000 now U.S. Pat. No. 6,661,610; the disclosure of which is incorporated herein by reference.

BACKGROUND OF THE INVENTION

The present invention belongs to the technical field of a magnetic tape used for DDS (digital data storage), DAT (digital audio tape) and the like. More particularly, the present invention relates to an evaluation reference tape capable of adequately evaluating a sensitivity correction of a dropout testing apparatus and a recording/replaying system of a magnetic tape, a method of manufacturing the evaluation reference tape and an apparatus for manufacturing the evaluation reference tape.

Magnetic tapes used for the DAT or the DDS are basically composed of a base layer which is a film such as PET (polyethylene terephthalate) or the like, a magnetic recording layer formed on one of the surfaces of the base layer, a backing layer formed on the surface of the base layer opposite to the magnetic recording layer for the purposes of improving the stability of the magnetic tape when it is transported and the strength thereof, and the like.

In the magnetic tape having such composition as described above, a defect of the magnetic recording layer derived from a scar or the like will cause a phenomenon such as a decrease of recording magnetic power or output, a recording or replaying error and is commonly called as dropout.

Therefore, in the magnetic tape, it is ideal that there is no dropout, however, the dropout is intrinsically unavoidable in the magnetic tape. For this reason, a dropout testing apparatus is employed at the time of manufacturing the magnetic tape to measure the number of the dropout which has exceeded a predetermined threshold value of at least one of output decrease and time length and, if the thus measured number exceeds, to judge the magnetic tape to be inappropriate or NG (no good) as a product.

In the case of DAT cartridges, there are many cases in which actual drives (recording/replaying apparatuses) are remodeled and then used as the dropout testing apparatuses. The threshold of the number of the dropout differs from tape to tape in accordance with the type thereof.

In order to appropriately execute the above-described dropout testing, it is necessary that the dropout testing apparatus should correctly measure the number of the dropout which exceeds the predetermined value so that sensitivity of the dropout testing apparatus should be appropriately set.

Therefore, in manufacturing of the magnetic tape, the magnetic tape which serves as reference, namely, an evaluation reference tape (hereinafter referred to simply as "reference tape") is manufactured so that it is put to use in sensitivity correction (calibration) of the dropout testing apparatus.

On the other hand, such a reference tape is not capable of knowing how large and deep a defect actually is on a magnetic recording layer.

There can only be known how large and deep the defect is by analyzing the magnetic tape. However, since it is essential that such analysis requires observation using an electron microscope or magnetic phenomenon, the thus analyzed magnetic tape results in being destroyed and no more applicable as a reference tape; therefore, such analysis is ordinarily performed on a part of the magnetic tape.

For the above-described reason, at present, sensitivity correction of the dropout testing apparatus can not be performed in accordance with the depth or size of the defect in the reference tape so that, in the dropout testing, correspondence between the dropout and the depth and size of the defect is vague; as a result, good quality control can not be performed.

SUMMARY OF THE INVENTION

A first object, therefore, of the present invention is to solve the above-described problems of the conventional technology and to provide an evaluation reference tape capable of performing sensitivity correction of a dropout testing apparatus in accordance with a depth or size of a defect, thereby, performing a more adequate quality control and production control by appropriately comprehending performance of the dropout testing apparatus and performing a dropout testing with higher precision which has taken individual differences and deterioration with age of the dropout testing apparatuses, and evaluating performance of recording/replaying system of the magnetic tape with higher precision and appropriately by measuring the performance of the recording/replaying system quantitatively.

A second object of the prevent invention is also to provide a method of manufacturing the evaluation reference tape which is capable of efficiently manufacturing the above-described evaluation reference tape of the present invention.

A third object of the present invention is further to provide an apparatus for manufacturing the evaluation reference tape which implements the method of manufacturing the evaluation reference tape of the present invention.

The above-described first object of the present invention can be attained by an evaluation reference tape comprising a magnetic tape having a base layer and a magnetic recording layer formed on one of both surfaces of the base layer, and at least one recess formed on the magnetic recording layer by processing the magnetic recording layer.

Preferably, the at least one recess corresponds to a dropout of the magnetic tape.

Preferably, the at least one recess is at least one straight groove extending in a longitudinal direction of the magnetic tape or at least one oblique groove extending in an direction oblique to the longitudinal direction of the magnetic tape.

Preferably, the at least one straight groove and the at least one oblique groove are arranged in at least one row along a widthwise direction of the magnetic tape.

The above-described second object of the present invention can be attained by a method of manufacturing an evaluation reference tape, comprising the steps of allowing at least one of a laser beam in a visible region and a laser beam in an ultraviolet region to be incident on a magnetic recording layer of a magnetic tape while the magnetic tape having a base layer and the magnetic recording layer formed on one of both surfaces of the base layer is transported in a longitudinal direction, and processing the magnetic recording layer to form a recess thereon.

Preferably, the laser beam to be incident on the magnetic recording layer of the magnetic tape is selected from the group consisting of a plurality of laser beams which have been split and imaged by a multiple-lens, a plurality of laser beams formed by splitting a laser beam by a splitting device, a laser beam scanned by a light scanning element, a plurality of laser beams split and imaged by simultaneously using both the splitting device and the multiple-lens.

Preferably, the at least one recess corresponds to a dropout of the magnetic tape.

Preferably, the at least one recess is at least one straight groove extending in a longitudinal direction of the magnetic tape or at least one oblique groove extending in an direction oblique to the longitudinal direction of the magnetic tape.

Preferably, the at least one straight groove and the at least one oblique groove are arranged in at least one row along a widthwise direction of the magnetic tape.

The above-described third object of the present invention can be attained by an apparatus for manufacturing an evaluation reference tape, comprising at least one light source for emitting at least one of a laser beam in a visible region and a laser beam in an ultraviolet region, an optical system which allows the laser beam emitted from the at least one light source to be incident on a predetermined processing position, a transportation device for transporting a magnetic tape having a base layer and a magnetic recording layer formed on one of both surfaces of the base layer in a longitudinal direction with the magnetic recording layer facing upstream of a light path of the laser beam while it is held in registry with the predetermined processing position, and a device for securing flatness of the magnetic tape when it is transported by the transportation device while it is held in registry with the predetermined processing position.

BRIEF DESCRIPTION OF THE DRAWINGS

FIG. 15 is a conceptual diagram of another embodiment of a manufacturing apparatus of the present invention;

FIG. 20 is a conceptual front diagram of another embodiment of grooves (recesses) formed on a magnetic recording layer of an evaluation reference tape of the present invention;

DETAILED DESCRIPTION OF THE INVENTION

An evaluation reference tape, an evaluation reference tape manufacturing method and an evaluation reference tape manufacturing apparatus of the present invention will be described in detail with reference to preferred embodiments shown in the accompanying drawings.

An evaluation reference tape of the present invention, which is a magnetic tape having an ordinary layer arrangement comprising a base layer (base film) composed of PET, aramid resin or the like, a magnetic recording layer or further an overcoat layer (protective layer) and a lower coat layer on one surface of the base layer as well as a backing layer (back coat layer) formed on the other surface of the base layer opposite to the magnetic recording layer, has a recess corresponding to a dropout of the magnetic tape, for example, a straight groove extending in a longitudinal direction of the magnetic tape or another oblique groove extending in an direction oblique to the longitudinal direction of the magnetic tape (hereinafter referred to simply as "oblique direction) formed on the magnetic recording layer.

Figure 1A:
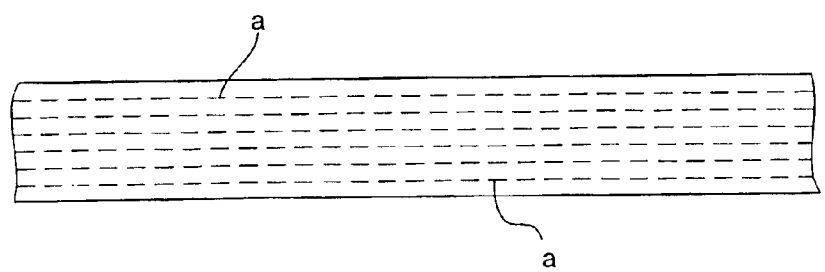
FIG. 1A and FIG. 1B are conceptual front views of embodiments of grooves (recesses) formed on magnetic recording layers of evaluation reference tapes of the present invention.
Figure 1B:
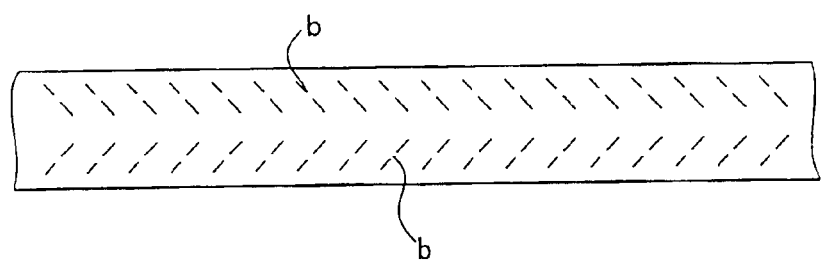

FIGS. 1A and 1B conceptually show magnetic recording layers of evaluation reference tapes (hereinafter referred to simply as "tape") of the present invention. In an embodiment shown in FIG. 1A, a multiplicity of grooves (processed line segments a) extending in the longitudinal direction of the tape are formed in a plurality of rows on the magnetic recording layer of the tape. In this case, a size (at least one of length and width) of the processed line segment is not particularly limited, but all the processed line segments may have the same size or a line segment having a different size may be mixed.

In an embodiment shown in FIG. 1B, a multiplicity of grooves (processed line segments b) extending in oblique directions are formed. In this case, an angle or a size of the processed line segment b is not particularly limited, but all the processed line segments b may have the same size or a line segment having a different size may be mixed.

Moreover, in the present invention, all the grooves or the like may have the same depth or a groove having a different depth may be mixed.

The tape according to the present invention has the recess as described above corresponding to the dropout, and preferably the recess having a known depth or size, on the magic recording layer.

By using the tape according to the present invention, sensitivity correction of the dropout testing apparatus can be performed in accordance with the depth or size of the defect of the tape without destroying the tape. As a result, performance of the dropout testing apparatus can appropriately be recognized and, moreover, better quality control of the magnetic tape can be performed by executing a highly precise dropout test which has taken differences of individual apparatuses and changes along the passage of time into consideration.

Moreover, by using the tape according to the present invention as described above, the test or evaluation of recording/replaying system of the magnetic tape can also adequately be performed.

In the tape according to the present invention, formed states (formed patterns) of the recesses are not limited to the illustrated embodiments, but various types of recesses can be used. For example, a groove extending in a widthwise direction of the tape may be formed or a multiplicity of circular or rectangular grooves may also be formed. When the groove is formed in the widthwise direction or in the oblique direction, the groove may be formed so as to pass through an edge of the tape in the widthwise direction or the groove may be formed so as to traverse the tape.

Further, at least two grooves which extend in the longitudinal, widthwise or oblique direction may be mixed and, in this case, such grooves may intersect with each other.

Figure 2A:
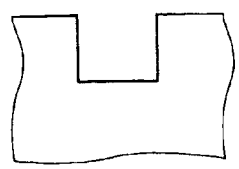
FIGS. 2A, 2B and 2C are conceptual sectional views of embodiments of forms of grooves (recesses) formed on a magnetic recording layer of an evaluation reference tape of the present invention.
Figure 2B:
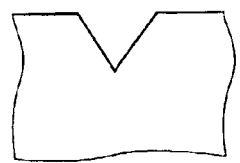
Figure 2C:
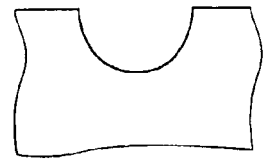

The shape (cross-sectional shape) of the recess is not particularly limited, and, for example, a rectangular shape as shown in FIG. 2A, a triangular shape as shown in FIG. 2B, a semi-circular (bow) shape as shown in FIG. 2C, and the like are exemplified.

A size, depth, shape, formed angle, formed intervals between grooves (in the longitudinal direction of the tape and in the widthwise direction of the tape), a formed pattern or the like of the recess described above can appropriately be selected or adjusted by adjusting a diameter of a beam spot of a laser beam for processing the magnetic recording layer, laser beam intensity, beam spot intensity distribution (profile), pulse modulation frequency of the laser beam, a scanning direction or scanning speed of the laser beam, transporting direction or transportation speed of the tape, a mask pattern or the like in the manufacturing method or manufacturing apparatus of the present invention to be described later.

The size, depth, shape, formed angle, formed interval between grooves, a formed pattern or the like of the recess can appropriately be selected or set in accordance with a tape width, track width, track angle (linear track or helical track), specifications of the dropout testing apparatus or the like.

In either case described above, preferably, the recess is formed so as to correspond to all bands of the tape or further all tracks of each band.

If what type of recess (dropout) exists on which track in a tape is preliminarily known, sensitivity correction of the dropout testing apparatus against various types of dropouts, or test and evaluation of the recording/replaying system of the magnetic tape can be performed by a reel of such tape.

Figure 3:
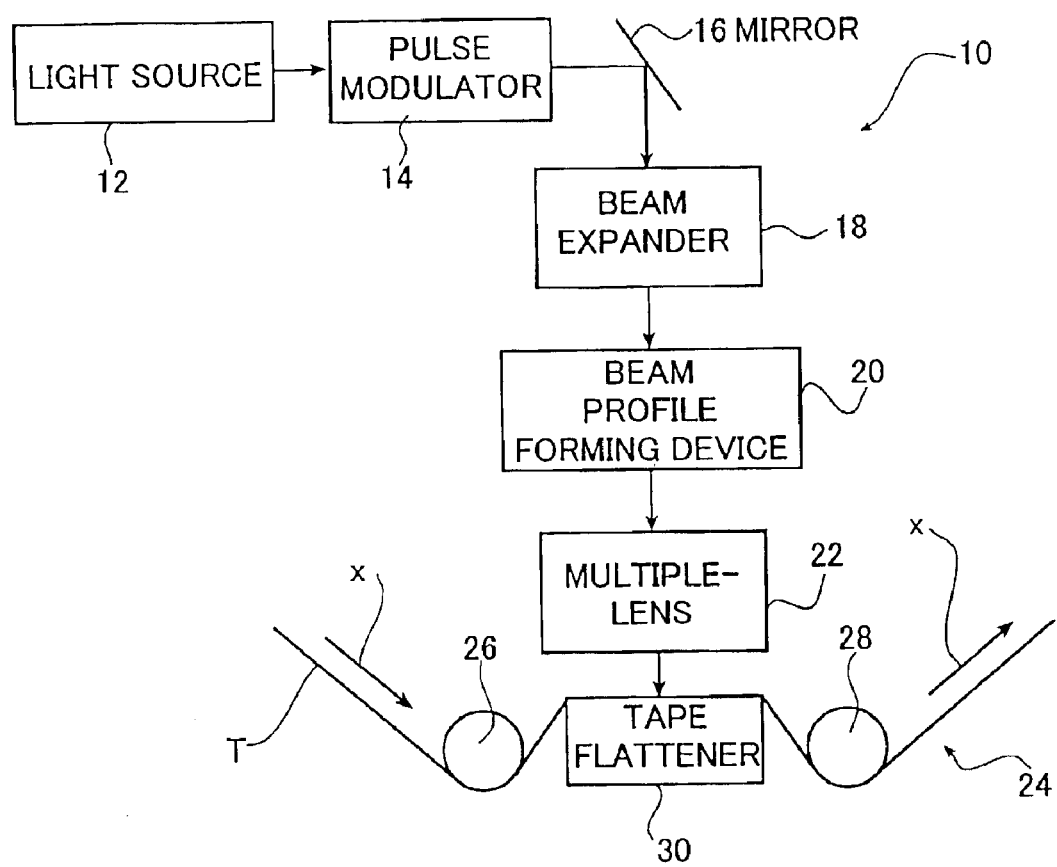
FIG. 3 is a conceptual diagram of an embodiment of an evaluation reference tape manufacturing apparatus of the present invention.

FIG. 3 conceptually shows a manufacturing apparatus according to the present invention for manufacturing the tape (evaluation reference tape) described above according to the present invention making use of a manufacturing method according to the present invention.

The illustrated manufacturing apparatus 10 for forming the groove (processed line or processed line segment) which extends in the longitudinal direction of the tape as shown in FIG. 1A, comprises an optical system essentially composed of a light source 12 for emitting a laser beam, a pulse modulator 14, a mirror 16, a beam expander 18, a beam profile forming device 20 and a multiple-lens 22, and a tape transportation device 24.

In the manufacturing apparatus 10 arranged as described above, the groove is formed on a tape T by allowing the laser beam emitted from the light source 12 to be incident on a predetermined processing position through the optical system while transporting the tape T, which is held in registry with the processing position, in the longitudinal direction (x-direction in the figure) by the transportation device 24.

The light source 12 is not particularly limited and various types of light sources (laser oscillators) can be used so long as they can emit at least one of a laser beam in an ultraviolet region and a laser beam in a visible region each having an output capable of processing the magnetic recording layer of the tape T. Note that a laser beam having a short wave length is preferable with respect to processability and thus the laser beam in the ultraviolet region is most preferable, whereas the laser beam in the visible region is preferable with respect to cost, workability and the like.

Specifically, exemplified as the light source 12 are argon (ion) lasers of 488 nm and 515 nm and a light source for emitting a laser beam of 532 nm which is obtained by subjecting a YAG laser to wavelength conversion with a SHG (second harmonic generation) element, and the like.

Moreover, the depth of the groove can be adjusted by adjusting output of the light source 12, namely, intensity of the laser beam.

As described above, in the illustrated manufacturing apparatus 10, the optical system comprises the pulse modulator 14, the mirror 16, the beam expander 18, the beam profile forming device 20 and the multiple-lens 22.

The pulse modulator 14 subjects the laser beam to pulse modulation to form the processed line segment as shown in FIG. 1A. As the pulse modulator 14, a known modulating device such as an AOM (acousto-optic modulator) or the like can be used. Moreover, length of the groove or the interval formed between grooves may be adjusted by adjusting a modulation period.

The laser beam is reflected by the mirror 16 in a predetermined direction and incident on the beam expander 18.

The manufacturing apparatus 10 forms the groove on the tape T by splitting a single laser beam; preferably the groove can be formed on the whole surface of the tape T in the widthwise direction thereof in correspondence to tapes T having various widths, particularly in correspondence to all tracks of the tape T. However, the diameter of a laser beam emitted from a light source is ordinarily about 1 mm and the tape T is wider than the diameter. Thus, the whole surface of the tape T in the widthwise direction thereof can not be processed with the laser beam per se.

To cope with the above problem, the beam expander 18 is disposed in the processing apparatus 10 to increase the diameter of the laser beam emitted from the light source 12. Take, for example, the diameter of the laser beam emitted from the light source 12 is 1 mm and the width of the tape T is 0.5 inch (12.7 mm), then it is sufficient to expand the diameter of the laser beam to about 15 times to 20 times. Moreover, the expanding ratio of the laser beam at the beam expander 18 may be adjustable.

The laser beam the diameter of which has been expanded by the beam expander 18 is then incident on the beam profile forming device (hereinafter referred to as forming device) 20. The forming device 20 makes the intensity of the laser beam substantially uniform on the whole surface of a beam spot. That is, the forming device 20 makes the intensity distribution of the laser beam substantially uniform.

Ordinarily, since the laser beam emitted from the light source 12 has a intensity distribution such as Gaussian distribution, when the tape T is processed with such a laser beam, the depths of the processed lines are established differently depending on the intensity distribution. Therefore, the provision of the forming device 20 makes the intensity distribution of the laser beam uniform so that the depths of the processed lines can be established substantially uniform; as a result, a tape T (evaluation reference tape) which can perform a sensitivity correction of the dropout testing apparatus with higher precision and evaluation of the recording/replaying system can be obtained.

Figure 4A:
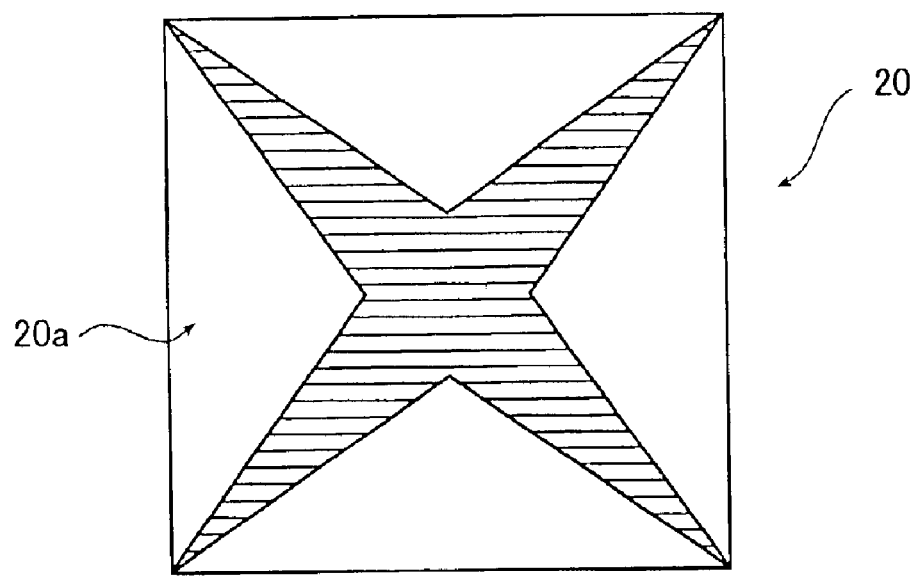
FIGS. 4A and 4B are conceptual views of embodiments of forming devices used in the evaluation reference tape manufacturing apparatus shown in FIG. 3.

As the forming device 20, for example, various types of optical filters can be used; as an embodiment, illustrated in FIG. 4A is a filter which is a regular tetragon formed by combining bases of isosceles triangles, having obtuse apical angles oriented inward, that are defined as light transmitting regions 20a and in which transmitted lumination increases as a position which light is incident on moves toward the periphery of the tetragon.

Figure 4B:
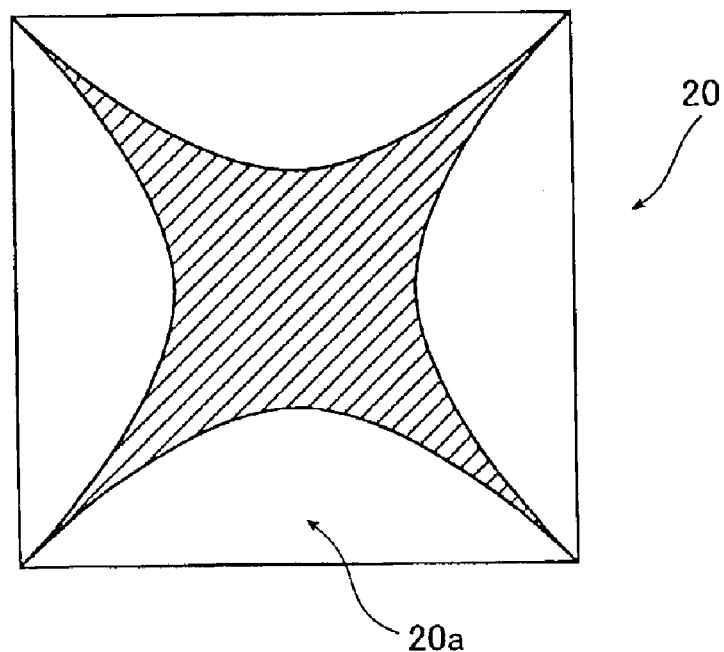

As shown in FIG. 4B, exemplified is another filter which is formed by combining light transmitting regions 20a each in an elliptic arc form in place of the above-described isosceles triangle in a similar way as in the above and in which transmitted lumination increases as a position which light is incident on moves toward the periphery of the tetragon.

Note that the filter having any of the above-described structures is not limited to a regular tetragon as illustrated but may be a pentagon or another polygon.

As the forming device 20, an optical filter system to be described below can also be used.

In this optical system, the laser beam the diameter of which has been expanded by the beam expander 18 is converged by a cylindrical lens to become a linear (slit state) laser beam extending in one direction (hereinafter referred to as u direction); then lumination of the thus generated linear laser beam is controlled by a slit which extends in the same direction as that of the laser beam and is constructed such that a passage area of the linear laser beam becomes wider as the linear laser beam moves toward an end portion thereof; and then the thus controlled laser beam is collimated to become fine beams, for example, by a cylindrical lens unit.

The diameter of the thus formed laser beam is expanded only in one direction by a cylindrical lens to change the laser beam into a linear laser beam extending in a v direction perpendicular to the above-described u direction; then lumination of the generated linear laser beam is controlled by the similar slit; and then the controlled laser beam is collimated into fine beams by the cylindrical lens unit in a similar manner to that in the u direction. As a result, the laser beam having a uniform lumination of its entirety can be obtained.

With reference to the slit, a slit 80 (lumination adjusting device 72b) shown in FIG. 12 to be described below can be used. Optionally, the diameter of the formed beam may be expanded by the beam expander.

On the contrary, the depths of respective grooves may appropriately be adjusted (selected) by providing the laser beam with intensity distribution by the forming device 20 when necessary.

Moreover, grooves having depths in accordance with the intensity distribution of the laser beam may be formed without provision of the forming device 20.

Subsequently, the laser beam is incident on the multiple-lens 22.

The multiple-lens 22 is composed of a multiplicity of microball lenses or SELFOC lenses which are disposed in a direction perpendicular to the optical axes which are in parallel with the laser beam. The multiple-lens 22 splits the laser beam incident thereon into a multiplicity of laser beams which are then incident on the predetermined processing position whereby they are imaged thereon. With this operation, the magnetic recording layer of the tape T is processed with the laser beams to form the grooves or the like thereon.

Figure 5A:
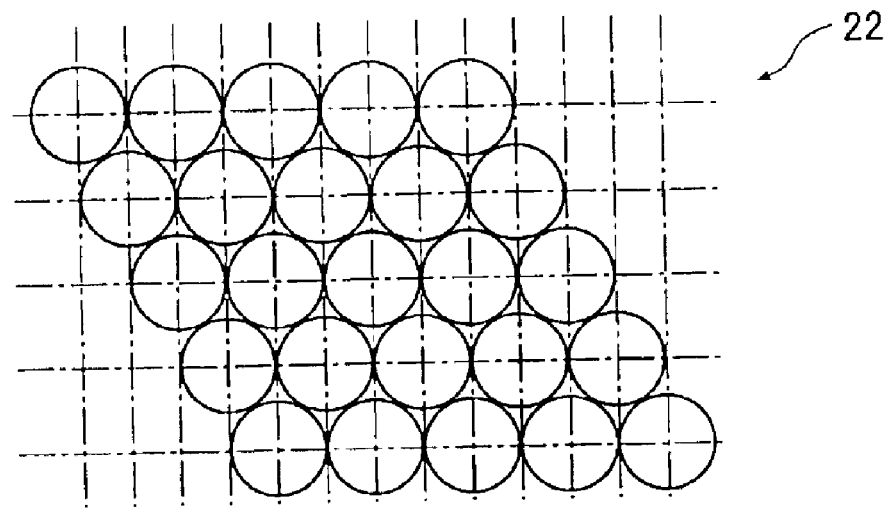
FIGS. 5A and 5B are conceptual views explaining multiple-lenses used in the manufacturing apparatus shown in FIG. 3.
Figure 5B:
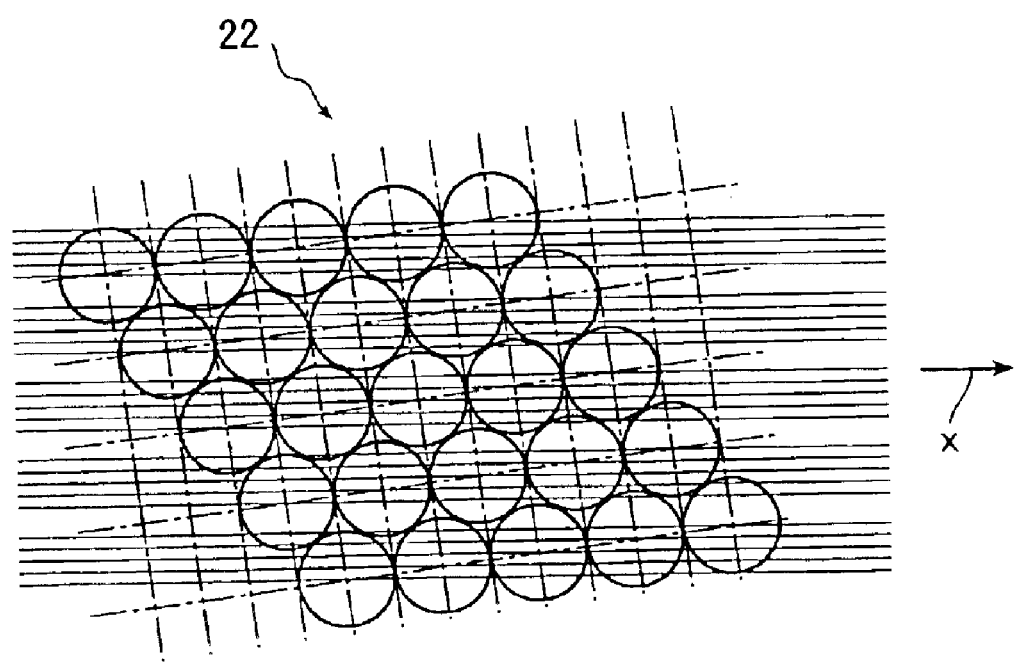

FIGS. 5A and 5B show schematic views of embodiments of multiple-lenses 22 observed from the direction of the optical axes thereof.

As an embodiment, the illustrated multiple-lens is arranged such that 5×5 pieces of microball lenses or SEL-FOC lenses (hereinafter both of them are called "lenses" as a whole) are disposed in the densest state as shown in FIG. 5A, and the disposing lines of lenses, which are shown by chain lines, are somewhat tilted with respect to the transporting direction x of the tape T as shown in FIG. 5B.

With this arrangement, as shown in FIG. 5B, the grooves (processed line segments a) of 25 rows in total in the widthwise direction of the tape T extending in the longitudinal direction can be formed by transporting the tape T only once (1 pass) in the longitudinal direction.

The intervals of the grooves can be adjusted by adjusting the angles between the transporting direction x and the disposing lines of the lenses. The angles must be set such that the optical axes (centers of beam waists) of respective lenses are not overlapped with each other in the transporting direction x in order to effectively form grooves.

Figure 6:
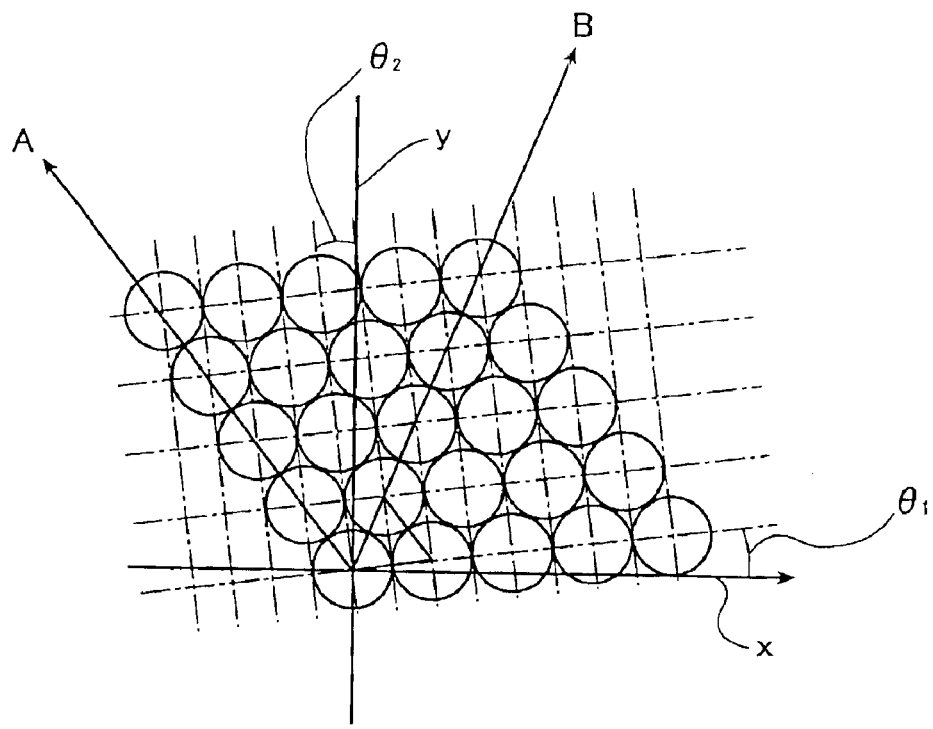
FIG. 6 is a conceptual view explaining a multiple-lens used in the manufacturing apparatus shown in FIG. 3.

As shown in FIG. 6, when attention is paid to the disposing lines of the lenses in a direction A, if the following formula is satisfied under the condition that N shows the number of lenses of a multiple lens in one disposing line and $\theta_1$ shows the angle between the transporting direction x and the disposing direction of the lenses, the optical axes of the lenses are not overlapped with each other in the transporting direction x:

$$\sin[(2\pi/3)+\theta_1] \geq N \cdot \sin \theta_1$$

Accordingly, the angle $\theta_1$ at which the optical axes of the lenses are not overlapped with each other can be calculated by the following formula:

$$\theta_1 \leq \tan^{-1}[\{\sin(2\pi/3)\}/\{N-\cos(2\pi/3)\}]$$

Similarly, when attention is paid to the disposing line of the lenses in a direction B, the optical axes of the lenses are not overlapped with each other in the transporting direction x when the angle $\theta_2$ between the direction (y-direction) perpendicular to the transporting direction x and the disposing direction of the lenses satisfies the following formula:

$$\theta_2 \leq \tan^{-1}[\{\sin(\pi/3)]\}/\{N-\cos(\pi/3)\}]$$

Figure 7:
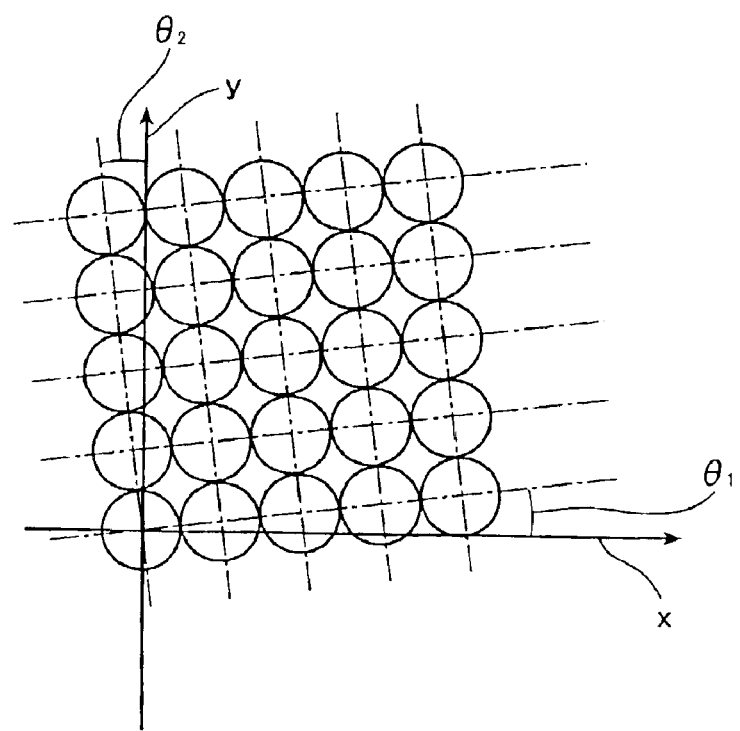
FIG. 7 is a conceptual view of another embodiment of a multiple-lens used in the manufacturing apparatus shown in FIG. 3.

In the present invention, the lens arrangement of the multiple-lenses is not limited to the densest state shown in FIG. 5 and the like, but various types of arrangements can be utilized. For example, the lenses may be disposed in a grid state as shown in FIG. 7. Otherwise, lenses may be disposed in one row or a plurality of rows in a direction having an angle with respect to the transporting direction x.

As shown in FIG. 7, when the lenses are disposed in the grid state, the optical axes of the lenses are not overlapped with each other in the transporting direction x if the angle $\theta$ between the transporting direction x (or the y-direction) and the disposing line of the lenses satisfies the following formula:

$$\theta \leq \tan^{-1}(1/N)$$

Note that processing intensity may be increased by forming one groove with a plurality of laser beams by overlapping the optical axes of lenses in the transporting direction x when necessary.

In the manufacturing apparatus 10, the tape T is transported in the longitudinal direction by the transportation device 24 with its magnetic recording layer side (front surface side) facing upstream of the light paths of the laser beams while held in registry with a predetermined processing position or positions by a tape flattener 30 (transported in a predetermined direction with the transporting direction x being in agreement with the longitudinal direction).

The transportation device 24 basically comprises a transportation drive device such as a capstan roller, a rewinder, a winder or the like which is not shown, guide rollers 26 and 28. The tape flattener 30 functions a device for securing the flatness of the magnetic tape T transported by the transportation device 24 at the predetermined processing position.

The tape flattener 30 touches the tape T in transportation on the rear surface and positions (holds) the tape T at the predetermined processing position.

The transportation passage of the tape T, which passes below the tape flattener 30, is formed by the guide rollers 26 and 28 disposed on opposite sides of the tape flattener 30 in the transporting direction x. With this arrangement, the tape T is supported by the tape flattener 30 so as to be positioned at the processing position.

In the present invention, since the processing of the magnetic recording layer executed by the laser beams is micro-processing so as to correspond to the dropout of the magnetic tape (sensitivity correction of the dropout testing apparatus), each diameter of the beam spots incident on the processing positions is small, that is, the permissible range of the beam waist is very narrow.

Therefore, it is requested that the tape flattener 30 positions the tape T with high precision, preferably with precision having an error of 10 $\mu$m or less in the focal depth direction of the multiple-lens 22.

Figure 8A:
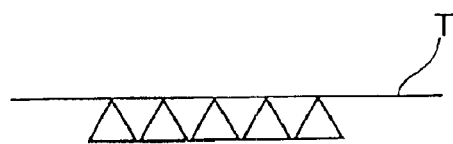
FIGS. 8A, 8B, 8C and 8D are conceptual views of embodiments of tape flatteners used in the manufacturing apparatus shown in FIG. 3.

Exemplified preferably as the tape flattener 30 for realizing the above requirement are at least two triangular prisms (blade edge type) which are disposed in the transporting direction x in such a manner that respective lateral edges thereof are located perpendicularly to the transporting direction x so as to support the tape T, as shown in FIG. 8A.

Figure 8B:
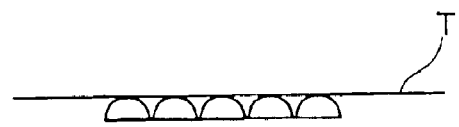
Figure 8C:
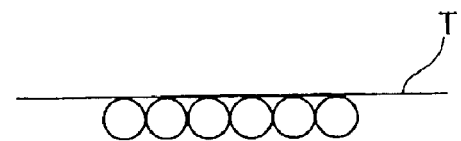
Figure 8D:

In addition to the above, preferably exemplified are a tape flattener composed of a plurality of support members as semi-circular (D-shaped) columns disposed similarly so as to support the tape T on respective side surfaces thereof as shown in FIG. 8B, a tape flattener composed of a plurality of support members as columns disposed similarly so as to support the tape T on respective side surfaces thereof as shown in FIG. 8C, a plate (rectangular solid) type flattener as shown in FIG. 8D, and the like.

As described above, the laser beam, which was emitted from the light source 12, subjected to pulse modulation by the pulse modulator 14 and reflected by the mirror 16, the diameter of which was expanded by the beam expander 18, the intensity distribution of which was made uniform by the forming device 20, which was split and the lumination of which was adjusted by the multiple-lens 22, is incident on the processing position and imaged thereon.

Therefore, when the tape T is transported in the longitudinal direction by the transportation device 24 as it is held in registry with the processing positions by the tape flattener 30 in the state that the front surface side thereof faces upstream of the light paths of the laser beams, grooves extending in the longitudinal direction are formed on the magnetic recording layer of the tape T. In the above aspect, 25 rows of grooves are formed when the tape T is transported once. Moreover, groove forming density can also be adjusted by adjusting transportation speed.

According to the present invention, processing intensity, namely, depth or size of the groove or, further, forming density or the like can be adjusted by appropriately selecting intensity of the laser beam, beam spot size, modulation frequency and transportation speed so that the (evaluation reference) tape according to the present invention having the above-described excellent characteristics can be manufactured in a adequate and easy manner.

Preferably, size and depth of the recess such as a groove or the like formed on the tape T can appropriately be comprehended. In this case, according to the present invention, these are controllable by means of processing intensity or transportation speed of the tape and, moreover, if the same tape is used, the similar recess can be formed with good reproducibility by the same processing condition so that, even if the size or depth of the recess is not particularly known, sensitivity correction of the dropout testing apparatus or evaluation of recording/replaying system of the magnetic tape can be performed in accordance with size or depth of the defect of the tape.

In the present invention using the laser beams in the visible light or ultraviolet region, it is considered that the magnetic recording layer is processed by the complex occurrence of both the thermal processing by the laser beams and the processing by ablation (dissociation and separation) executed by the laser beams.

In the present invention, process wastes such as powder dusts and the like and gases are often produced when the magnetic recording layer of the tape T is processed.

To cope with this problem, it is preferable to provide a removing device at the processing position to remove the process wastes and the gases. Moreover, it is preferable to provide a cleaning device downstream of the processing position to remove foreign matters adhered to at least a surface of the tape T and particularly to the front surface thereof.

As the removing device, a scrubber or a suction device such as a local ventilation device and the like may be used;

and, as the cleaning device, any known method executed when the magnetic tape is manufactured such as a method of using a cleaning tape or the like may be used.

Figure 9:
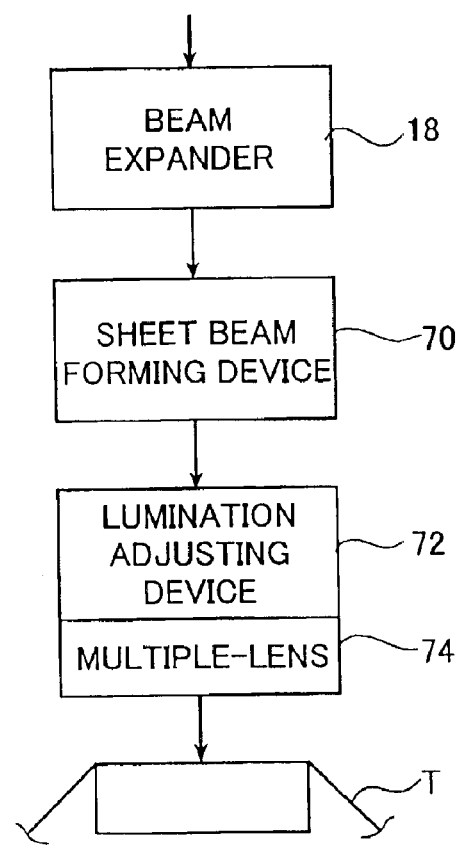
FIG. 9 is a conceptual diagram of another embodiment of an evaluation reference tape manufacturing apparatus of the present invention.

FIG. 9 show a construction of another embodiment of the present invention.

The embodiment shown in FIG. 9 employs a sheet beam forming device 70, a rumination adjusting device 72 and a multiple-lens 74 in place of the forming device 20 and the multiple-lens 22 in the processing apparatus 10 shown in FIG. 3. Note that, since the embodiment shown in FIG. 9 has the similar construction to that of the processing apparatus 10 shown in FIG. 3 except for components described above, only different components will be mainly described below.

Figure 10:
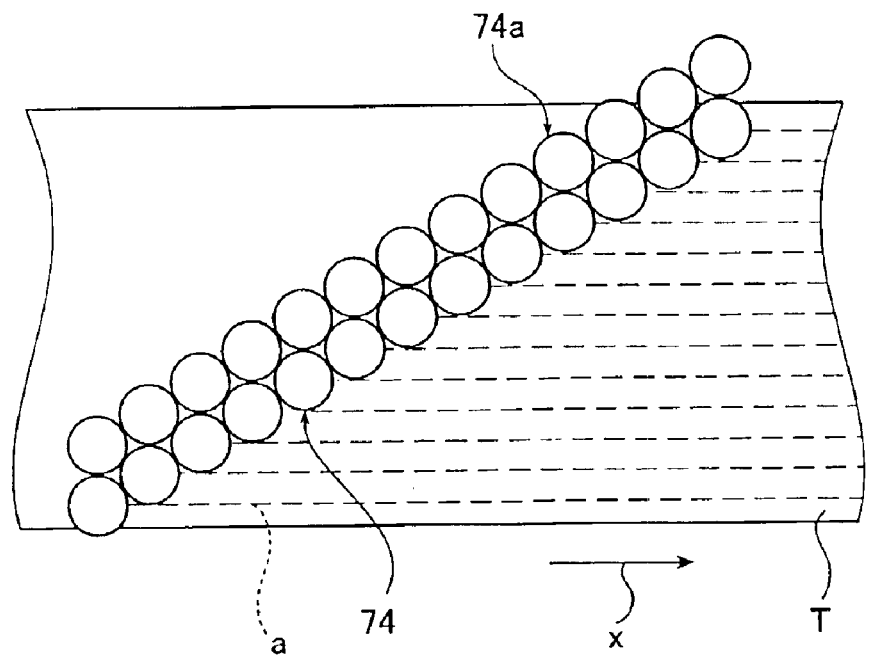
FIG. 10 is a conceptual view of an embodiment of a multiple-lens used in the evaluation reference tape manufacturing apparatus shown in FIG. 9.

The multiple-lens 74, in the same way as in the above-described multiple-lens 22, images the laser beam on the magnetic recording layer thereby performing processing and, moreover, in the case of the embodiment shown in FIG. 9, a lens array of one row disposed in a direct line as shown in FIG. 10 is employed as the multiple-lens 74 in place of the multiple-lens in the densest state. In the illustration, the lens array similar to one row of lenses of a lens arrangement of 13×13 pieces which have been disposed in the densest state is disposed in such a way that the lenses extend obliquely in relation to the widthwise direction of the tape T.

In this case, a dummy lens array 74a is disposed upstream of the transporting direction of the tape T so as to secure alignment precision, position precision, linearity or the like of the multiple-lens 74. Otherwise, an optical substrate having good flatness may be used in place of the dummy lens array 74a.

In the present invention, the multiple-lens in the lens array state as described above is not limited to the lens array corresponding to the densest state, but various types of lens arrays in which a plurality of lenses are disposed at predetermined intervals (pitches) in accordance with the interval or number of recesses to be formed can be used; and, moreover, it is not limited to the lens array disposed obliquely in relation to the widthwise direction of the tape T, but is permissible to that disposed in the same direction as the widthwise direction.

Moreover, only one row of the multiple-lens in the densest state shown in FIG. 5 and the like may be acted in the light paths of laser beams for use as the lens array.

When the lens array in the densest state as the multiple-lens (or multiple-lens packed in the densest state) is used, efficient processing is possible by calculating the angle or the like of the lens array in a similar way to that described above.

In the embodiment shown in FIG. 9, the beam expander 18 collimates laser beams.

The sheet beam forming device 70 expands only in one direction the diameter of the laser beams which have been collimated with the beam expander 18 to produce laser beams in linear states (slit states) extending in one direction which agrees with the alignment direction of the multiple-lens 74.

As the sheet beam forming device 70, various types of known optical elements (inclusive of combinations thereof) can be used so long as they perform the above-described action. For example, cylindrical lenses may be used as constituents.

Otherwise, in the present embodiment, the laser beams may remain in fine forms as they are without using the beam expander 18 or the diameters of the laser beams which have been converged are expanded by the sheet beam forming device only in one direction and then collimated to be linear laser beams extending in one direction.

The laser beams which have been changed into those in linear states by the sheet beam forming device 70 are incident on the lumination adjusting device 72.

The lumination adjusting device 72 makes the lumination (light intensity distribution) of the laser beams incident on respective lenses of the multiple-lens 74 to be uniform in the whole area thereof.

As described above, the laser beam has the Gaussian distribution so that the lumination of the linear (sheet-like) laser beams obtained by the sheet beam forming device 70 gradually diminishes as the lumination of the linear laser beams deteriorates from the center toward either end in the longitudinal direction in accordance with the Gaussian distribution possessed by the original laser beams.

To cope with this problem, the lumination of the laser beams incident on the multiple-lens 74 is allowed to be uniform in the whole area thereof by disposing the rumination adjusting device 72 whereupon it is possible to perform a uniform processing on all the recesses and then to perform sensitivity adjustment of the dropout testing apparatus with high precision.

Between the sheet beam forming device 70 and the lumination adjusting device 72, for example, a slit or the like, which cuts (shades) unnecessary regions that are in both end portions of the laser beams, for example, by means of cutting a region that is less than half-width of the linear laser beams, cutting a region that does not contribute to processing of the tape T or doing other actions, may be provided.

Figure 11:
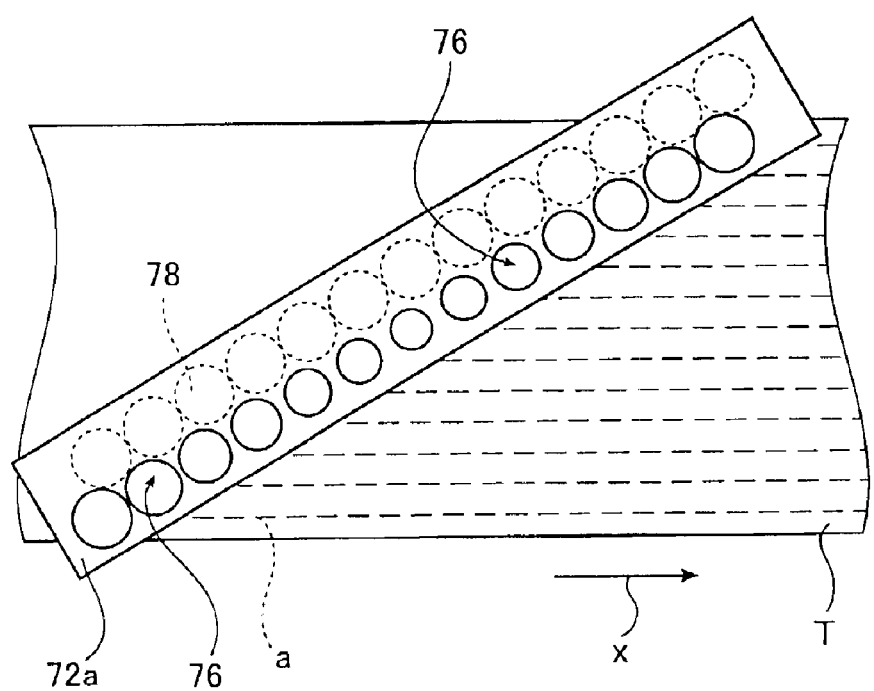
FIG. 11 is a conceptual view of an embodiment of lumination adjusting device used in the evaluation reference tape manufacturing apparatus shown in FIG. 9.

As the lumination adjusting device 72, various types can be used so long as they are capable of making lumination of laser beams incident on respective lenses of the multiple-lens 74 in lens array state to be uniform in the whole area thereof, and, as a preferred embodiment, a lumination adjusting device 72a as shown in FIG. 11 is illustrated.

FIG. 11 shows the lumination adjusting device 72a viewed from the direction of optical axes of laser beams; the device has circular apertures 76 corresponding to respective lenses of the multiple-lens 74 with the centers thereof agreeing with respective optical axes of corresponding lenses. The aperture 76 has a diameter in accordance with the lumination distribution in the longitudinal direction of the laser beams. The rumination adjusting device 72a makes the lumination of the laser beams incident on respective lenses of the multiple-lens 74 to be uniform in the whole area thereof and, as an embodiment, adjusts the rumination of the laser beams incident on respective lenses of the multiple-lens 74 to be rumination of half-width of the laser beams.

A circle shown in a dotted line in FIG. 11 shows a dummy lens of the multiple-lens array 74a.

In the lumination adjusting device 72a as described above, for example, if the lumination incident on the aperture 76 at the end portion is half-width, the lumination incident on the aperture 76 in the center may be brought to be half of the original lamination, namely, the diameter of the aperture 76 in the center may be brought to be 60% of the original diameter.

When the magnetic recording layer is processed, a predetermined laser power is necessary; however, when the diameter of a beam incident on a lens becomes smaller, the diameter of beam waist becomes larger thereby decreasing processability; therefore, a relation between a diameter of the beam waist necessary for processing and a diameter of the beam waist of the laser beams actually incident may preliminarily be obtained by calculation when necessary.

Figure 12:
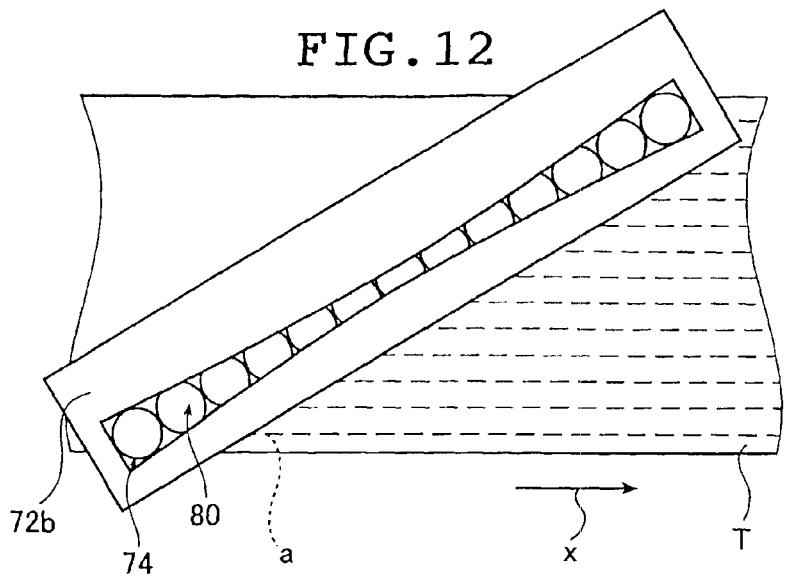
FIG. 12 is a conceptual view of another embodiment of lumination adjusting device used in the evaluation reference tape manufacturing apparatus shown in FIG. 9.

As the lumination adjusting device, in addition to the above-described embodiments, the lumination adjusting device 72b which utilizes a slit as shown in FIG. 12 is also adequately used.

The illustrated lumination adjusting device 72b, which is a plate having a slit regulating passage of linear laser beams, has a slit 80 extending in the same direction as those of the laser beams (alignment direction of the multiple-lens 74). The slit 80 is constituted in such a manner that transmitted lumination gradually decreases as the position of rumination moves from the center to an edge portion in accordance with rumination distribution of the linear laser beams. The illustrated embodiment makes the lumination of laser beams incident on respective lenses of the multiple-lens passing through the slit 80 to be uniform in the whole area thereof and, as an aspect, adjusts the lumination in the whole area in the longitudinal direction of the linear laser beams to be of half-width in the similar way to that in the lumination adjusting device 72a described above.

The above-described lumination adjusting device 72b has a characteristic that the fabrication thereof is easier than the lumination adjusting device 72a having the above-described aperture 76; on the other hand, it has a possibility of making allowable depth to be shallow due to astigmatism so that attention should be paid to the design thereof.

The lumination adjusting device 72 as described above may be disposed either upstream of the multiple lens 74 as illustrated or downstream thereof.

However, when the lumination adjusting device 72 is disposed downstream of the multiple-lens 74, size, form or the like of the aperture 76 or the slit 80 or the like is necessary to be set by taking the narrowing of the laser beams by the multiple-lens 74 into consideration in such a way that the lumination of the laser beams becomes uniform in the whole area.

In the embodiment shown in FIG. 3 or FIG. 9, the laser beams are split using the multiple-lens 22 and imaged on the processing positions. However, the present invention is not limited thereto and various types of arrangements can be used.

Figure 13:
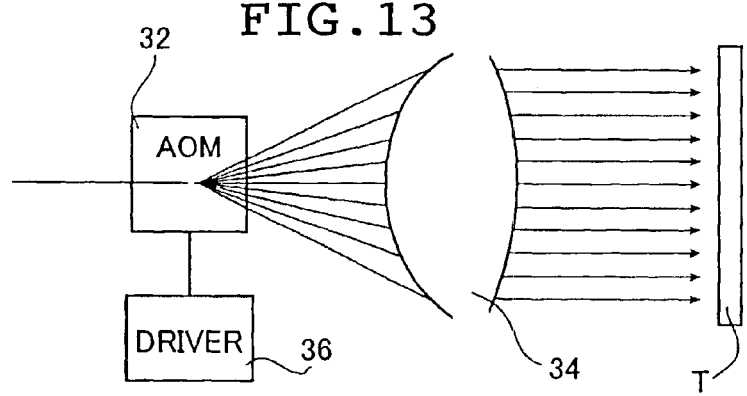
FIG. 13 is a conceptual view explaining another embodiment of an optical system used in the manufacturing apparatus shown in FIG. 3.

For example, a method of using an AOM (acousto-optic modulator) 32 and an imaging lens 34 as shown in FIG. 13 in place of the multiple-lens 22 is exemplified. Note that, in FIG. 13, the tape T is transported in the direction vertical to the plane of the sheet.

In the present embodiment, the AOM 32 is used as a laser beam splitting device and a plurality of frequency signals are inputted to the AOM 32 by a driver 36 (or frequency signals are continuously varied). With this operation, a multiplicity of Bragg diffraction are generated and laser beams are emitted at a multiplicity of Bragg angles.

The plurality of laser beams are made to light beams, which are in parallel with each other and imaged on processing positions by the imaging lens 34, whereby a plurality of grooves extending in the longitudinal direction can be formed in the similar way to that in the above embodiments.

Figure 14:
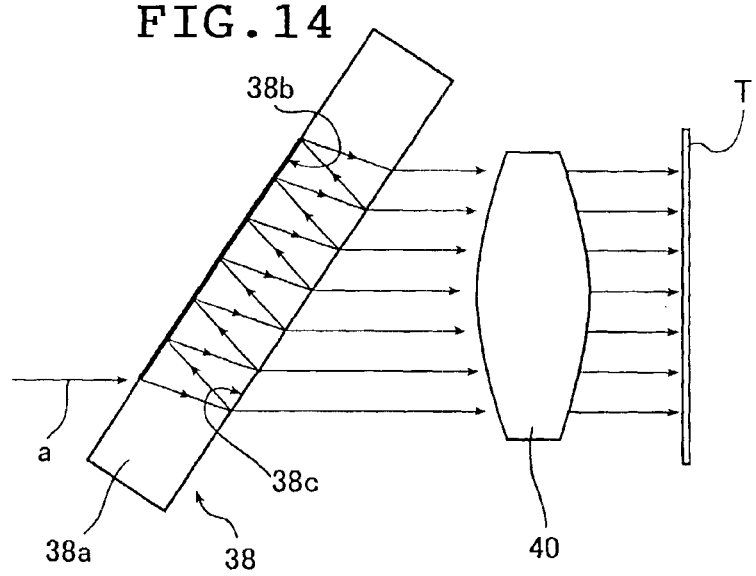
FIG. 14 is a conceptual diagram explaining another embodiment of an optical system used in the manufacturing apparatus shown in FIG. 3.

FIG. 14 shows another embodiment. The present embodiment employs the splitting device 38 and the imaging lens 40 in place of the multiple-lens 22 in the manufacturing apparatus 10 shown in FIG. 3 similarly to the embodiment shown in FIG. 13. Also in the present embodiment, the tape T is transported in the direction vertical to the plane of the sheet.

The splitting device 38 is composed of a parallel plane glass substrate 38a having an inner side to which laser beam reflecting coating is applied and splits a laser beam making use of multiple-reflection.

As shown by the arrow a in FIG. 14, a laser beam is incident on the splitting device 38 (parallel plane glass substrate 38a), repeats reflection inside the parallel plane glass substrate 38a under the action of a coated reflecting film 38b as shown in the figure and is projected from the parallel plane glass substrate 38a as split laser beams. Therefore, the number of split can be set by the incident angle of the laser beam in relation to the parallel plane glass substrate 38a.

The laser beams projected from a projection surface 38c are imaged on the processing positions by the imaging lens 40. With this operation, a plurality of processed lines extending in the longitudinal direction of the tape T can be formed on the magnetic recording layer thereof in the similar way to that in the above embodiment.

In the embodiment shown in FIG. 14, the intensity of the projected laser beams may be adjusted by adjusting the reflectance ratio of the projection surface 38c opposing the reflection film 38b of the parallel plane glass substrate 38a. Note that the reflectance ratio of the projection surface 38c may be adjusted over the whole surface thereof or only in the regions thereof on which the laser beams may incident.

Further, the forming density of processed lines, the processing intensity thereof or the like may be improved by allowing a plurality of laser beams to be incident in the transporting direction x or a plurality of laser beams having different incident angles from each other to be incident on the parallel plane glass substrate 38a similarly to the above embodiments.

Moreover, in the embodiments shown in FIGS. 13 and 14, it is not necessarily required for the beam expander 18 to be provided.

In FIG. 15, illustrated is another embodiment of the manufacturing apparatus of the present invention.

In FIG. 15, though the transportation device is not illustrated, it may be similar to that in the manufacturing apparatus 10 shown in FIG. 3. In FIG. 15, the tape T is transported also in the direction of arrow The manufacturing apparatus 82 shown in FIG. 15 comprises a light source 12, an intensity modulator 84, a beam waist position adjusting device 86, a beam forming device 88, a mask 90 and a converging lens 92.

The light source 12 is similar to that of the manufacturing apparatus 10 shown in FIG. 3.

The intensity modulator 84 adjusts depth of a recess (processing intensity) by adjusting the intensity of laser beams projected from the light source 12. As the intensity modulator 84, various types of known intensity modulating devices of laser beams such as the AOM or the like can be used.

Moreover, if the light source 12 can directly be modulated, the intensity modulator 84 may not necessarily be provided.

The beam waist position adjusting device 86 adjusts the beam waist positions (optical axis directions) of respective laser beams split by the mask 90 which will be described below to the processing positions thereof.

In the illustration, positions on which spaces of respective split laser beams to be converged by the converging lens 92 are to be predetermined intervals in the optical axes as designated as processing positions; and, as a preferred embodiment, positions (intervals), in the widthwise direction of the tape T, of respective laser beams which are to be converged by the converging lens 92 are designated as the processing positions that agree with track positions of the tape T to which beam waist positions are adjusted. For example, in the illustration, the tape T has 12 tracks; therefore, as described below, the manufacturing apparatus 82 enables 12 laser beams to be incident on the tape T in the widthwise direction so that laser beams are incident on all tracks of the tape T on a one-laser-beam-to-one-track basis. Then, according to the present embodiment, recesses corresponding to respective tracks of the tape T can be formed.

Moreover, the processing positions are adjusted by moving optical system or the transportation device of the tape T in the optical axis, the number of the laser beams which are incident in the widthwise direction of the tape T is adjusted (maximum number is 12 in the illustration) and the beam waist is adjusted whereupon the processing positions can adequately correspond to respective types of tapes T having different sizes of width or different numbers of tracks from each other.

The beam waist position adjusting device 86 is not limited to any particular type, but various types of known devices can be used; and, exemplified is a device for adjusting the beam waist position based on the calculation made by the ABCD matrix obtained by H. Kogelnic using, for example, a set of lenses or the like whose positions on an optical axis and whose intervals can be adjusted.

The beam forming device 88 not only expands the diameters of beams of the laser beams to the predetermined sizes, but also makes the light intensity (intensity distribution) in the direction perpendicular to the optical axes (beam spot) to be uniform on the whole area thereof. By this operation, the depth of the recesses (processing intensity) formed by respective laser beams is made uniform so that more accurate sensitivity correction of the dropout testing apparatus or evaluation of recording/replaying system of the magnetic tape can be performed.

As the beam forming device 88, various types including an optical element having the above-described action or a combination of optical elements having such actions can be used; as an embodiment, exemplified is a combination of the forming device 20 and the beam expander which has been exemplified in the above-described manufacturing apparatus 10 or the like.

The mask 90 comprises a plurality of apertures (openings), through which laser beams passes, formed two-dimensionally on a light-shading member.

In the manufacturing apparatus 82 in the illustration, the laser beam the diameter of which has been expanded by the beam forming device 86 is split into a plurality of laser beams by the mask 90.

Figure 16A:
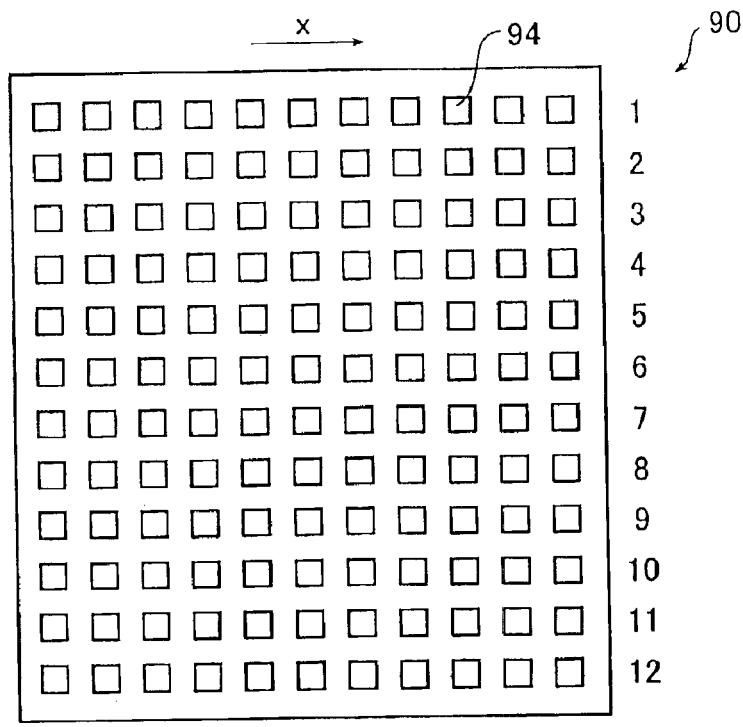
FIGS. 16A and 16B are schematic views of embodiments of masks of the manufacturing apparatus shown in FIG. 15.
Figure 16B:
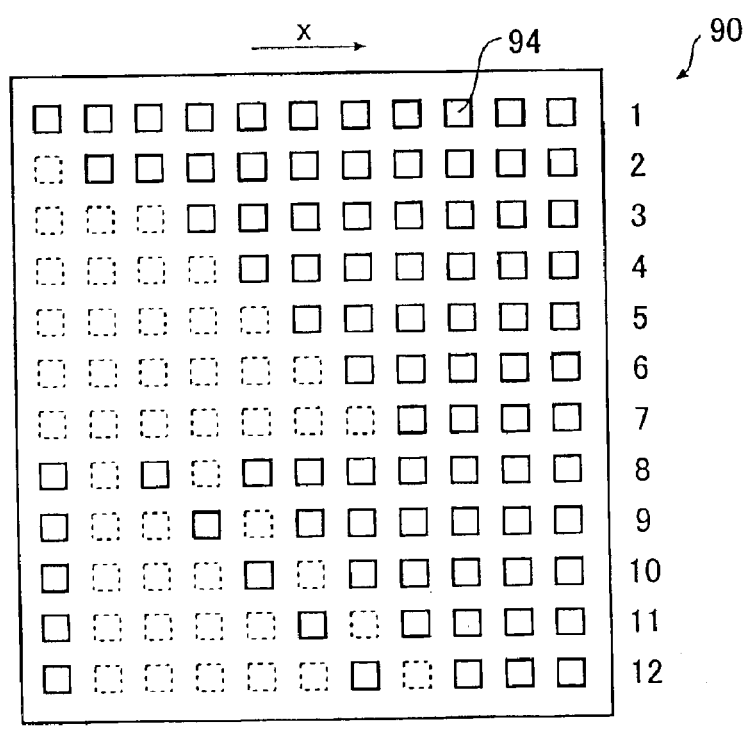

FIGS. 16A and 16B schematically show embodiments of the masks viewed from the direction of the optical axis.

As shown in FIG. 16A, the mask 90, having total 132 pieces of apertures 94 in a square form with same size in such a structure that 12 pieces are disposed in the widthwise direction of the tape T at intervals of the same distance and 11 pieces are disposed in the transporting direction (direction of arrow x) thereof at intervals of the same distance, splits the laser beams the diameter of which has been expanded and the intensity distribution of which has been made uniform by the beam forming device 88 to produce 132 laser beams at the maximum.

Therefore, the manufacturing apparatus 82 can form recesses corresponding to all tracks of the tape T if the number of tracks thereof is up to 12.

Apertures 94 which have respective liquid crystal shutters can independently change the states thereof from one state in which the laser beam can pass therethrough to the other state in which the laser beam can not pass therethrough or vice versa; for example, the apertures 94 which are opened as shown in FIG. 16B (apertures 94 in closed states are shown in dotted lines) can only permit the laser beam to pass therethrough to split it into a plurality of laser beams.

Namely, the manufacturing apparatus 82 illustrated in FIG. 15 can arbitrarily change patterns of laser beams incident on the tape T, that is, forming patterns of recesses on the tape T by the laser beams by means of changing patterns of apertures 94 in open states.

Moreover, if the liquid crystal shutter can shade laser beams as well as be resistant to heat, for example, a known shutter such as a liquid crystal shutter employing high-luminance liquid crystal or the like can be used.

In the manufacturing apparatus 82, the mask constituting the splitting device of the laser beam is not limited to the type having a liquid crystal shutter as illustrated, but another type, such as that having only apertures without liquid crystal shutter or that having a combination of apertures with and without the liquid crystal shutters, may be permissible. Moreover, other light shutters than the liquid crystal shutter can adequately be used so long as they have a good response property and thermal resistance. However, in any construction, the number of apertures in the widthwise direction is preferably the same as or more than that of total tracks of the tape T to be processed.

Furthermore, non-light-emitting display such as a liquid crystal display, for example, TFT (thin film transistor) or the like may be used as the mask whereupon an aperture in an arbitrary shape may be formed in an arbitrary position, so long as it has sufficient heat resistance and shading property.

The laser beams split by the mask 90 are converged by the converging lens 92, are incident on the tape T which is transported in the direction of arrow x while it is held in registry with the processing position and perform processing on the magnetic recording layer to form recesses thereon. The converging lens 92 may be of the type the refractive index (lens power) of which is adjustable.

In this case, as described above, the processing position has been set so as to allow intervals of laser beams, which are converged by the converging lens 92, in the widthwise direction of the tape T to correspond to intervals of respective tracks of the tape T, namely, so as to agree with positions on which laser beams are incident in respective tracks of the tape T and, moreover, the beam waists of all laser beams are adjusted so as to agree with these positions.

In the manufacturing apparatus 82, illumination of the tape T with the laser beams are not continuously performed but intermittently performed by repeating illumination (that is, processing) and non-illumination at predetermined intervals of time.

Moreover, the intermittent illumination of the tape T with the laser beams may be performed by turning the light source 12 on and off, intensity adjustment by means of the intensity modulator 84, opening/shading operations of apertures of the mask 90 or the like.

The apertures 94 of the mask 90 have openings in a pattern as shown in FIG. 16B as an embodiment.

Figure 17:
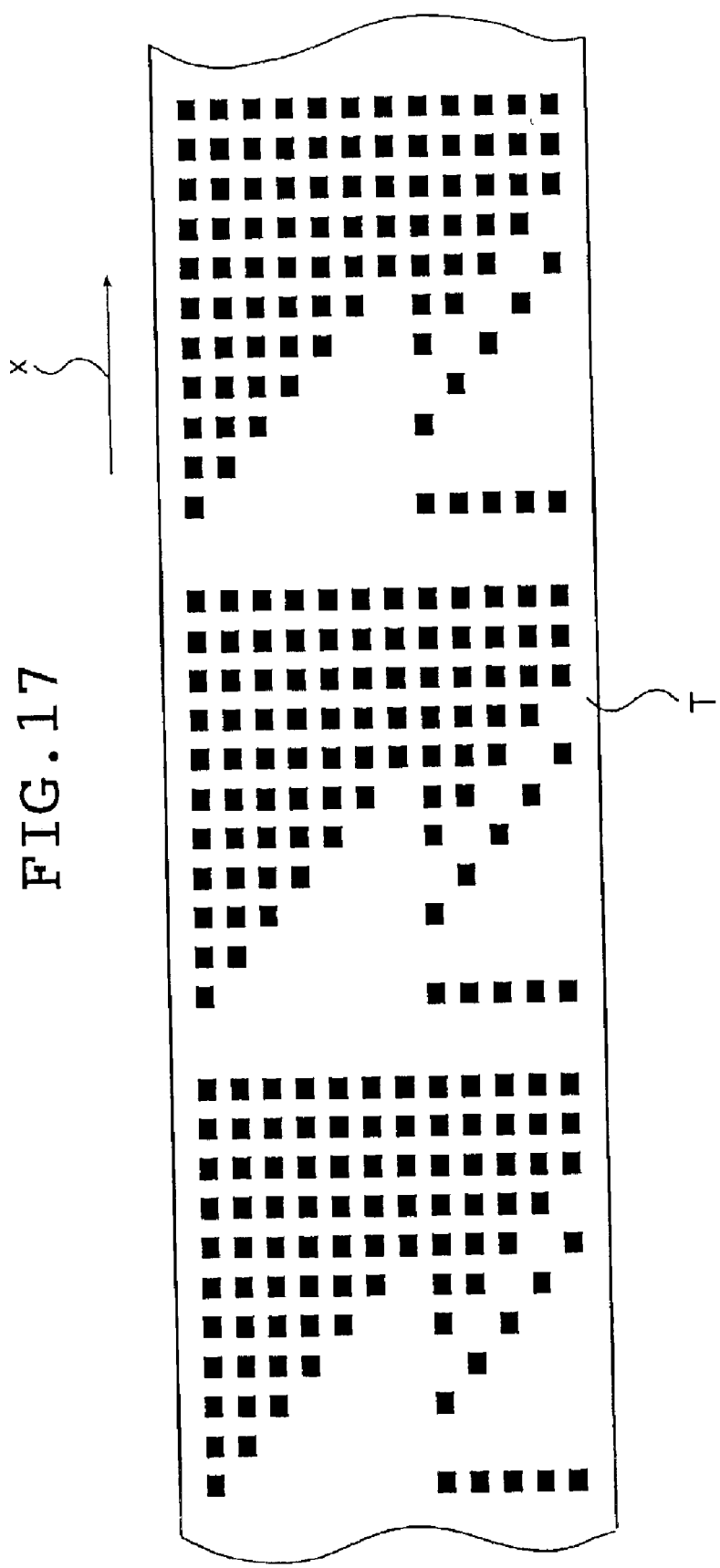
FIG. 17 is a conceptual view of an embodiment of an evaluation reference tape manufactured by the manufacturing apparatus shown in FIG. 15.

Therefore, recesses are formed in blocks in a pattern as shown in FIG. 17 in correspondence with the openings of the apertures 94 by one-time illumination of the tape T with the laser beams and then such patterns in blocks (three blocks are illustrated in the figure) are formed in a continuous manner in the longitudinal direction of the tape T by intermittent illuminations with the laser beams.

In this case, if the period of time of one illumination (for forming recesses in one block) is too long, recesses to be formed with the laser beams passing through the apertures 94 arranged in the transporting direction will be overlapped with each other in the transporting direction of the tape T. To contrast, if the period of time of non-illumination is too short, namely, if a repeating cycle of the intermittent illumination is too short, patterns in blocks to be continuously formed in the transporting direction are overlapped with each other.

Take the size of the laser beam, which has passed through an aperture, in the longitudinal direction on the tape T as Db(m) (since the aperture is a square, the size in the widthwise direction is the same as that in the longitudinal direction), the interval (pitch) thereof in the transporting direction as Lp(m), the size of the above-described one block thereof in the longitudinal direction on the tape T as La(m), the running speed of the tape T when it is processed as St(m/sec); and, if Pt(sec) denoting the time of one-time illumination of intermittent illuminations by the laser beam is set in such a way that it satisfies the following expression, then recesses to be formed by the laser beam, which has passed through the aperture 94 arranged in the transporting direction of the tape T, are prevented from being overlapped with each other in the transporting direction of the tape T:

$$Pt<Lp/St$$

Moreover, similarly to the above case, if Pt(sec) denoting a repeating cycle of the intermittent illuminations is set in such a way that it satisfies the following expression, blocks to be continuously formed are prevented from being overlapped with each other:

$$Pr<La/St$$

The above-described Db, Lp and La on the tape T, further the size of the laser beam in the widthwise direction and the size of the above-described block in the widthwise direction on the tape T are determined by the size of the aperture 94, an interval of apertures 94, the size of the region in which the aperture 94 is formed on the mask 90, adjusting intensity of the beam waist position adjusting device 86, power of the converging lens 94 and the like; preferably, the sizes and intervals of apertures 94, and the size of region in which apertures 94 are formed on the mask 90 are adjusted so as to form adequate recesses on the magnetic recording layer of the tape T.

As is apparent from the above description, according to the manufacturing apparatus 82, the (evaluation reference) tape T in which what type of recess, i.e., dropout exists in which track have preliminarily been known can be manufactured in accordance with the pattern of openings of the apertures 94 on the mask 88, intensity adjustment of the laser beam by the intensity modulator 84 or the like. Therefore, sensitivity correction of the dropout testing apparatus can adequately be performed by one reel of the tape T and, moreover, evaluation of the magnetic recording/replaying system against a variety of dropouts corresponding to a plurality of or preferably all of tracks can be performed.

In the manufacturing apparatus 82, a signal showing that what depth of the recess is formed in which track, another signal showing a pattern of openings of the mask 88 or the like is preliminarily determined as a forming pattern of the recess, for example, by means of a digital signal or a barcode whereupon other recess showing the thus determined signal than the recess designated as the dropout may be formed.

Figure 18:
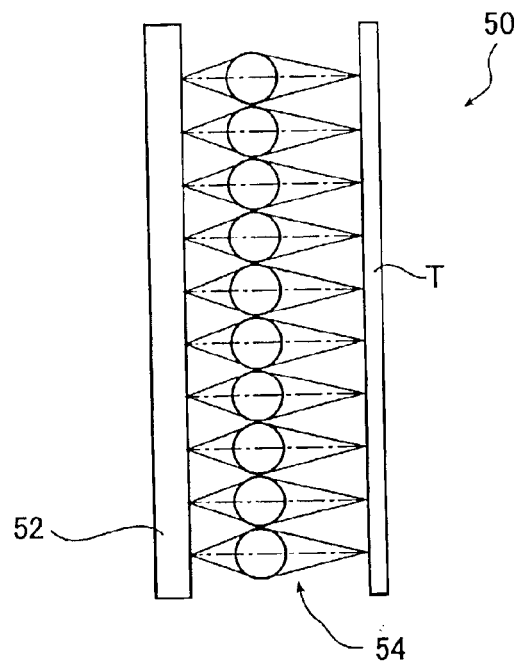
FIG. 18 is a conceptual view of another embodiment of a manufacturing apparatus of the present invention.

FIG. 18 shows another embodiment of a manufacturing apparatus of the present invention for forming the grooves extending in the longitudinal direction of the tape T as shown in FIG. 1A on the magnetic recording layer thereof.

Note that, while FIG. 18 does not show a transportation device, it may be similar also in the present embodiment to that of the manufacturing apparatus 10 shown in FIG. 3.

Moreover, the tape T is transported in the direction vertical to the plane of the sheet also in FIG. 18.

The manufacturing apparatus 50 shown in FIG. 18 comprises a laser diode (LD) array 52 in which laser diodes that emit laser beams in a visible region, or in an ultraviolet region, preferably, blue laser beams are disposed and a lens array 54 in which lenses that image laser beams emitted from the LDs of the LD array 52 in processing positions are disposed wherein the LD array 52 and the lens array 54 are disposed such that the directions in which they are disposed have an angle with respect to the transporting direction x.

Grooves extending in the longitudinal direction can be formed on the magnetic recording layer of the tape T by similarly using the optical system arranged in the way as described above and by similarly transporting the tape T in the longitudinal direction by the transportation device while applying a multiplicity of laser beams to the processing positions.

Microball lenses, SELFOC lenses (GRIN lenses) and the like are exemplified as the lenses constituting the lens array 54.

In addition, the LD array 52 (as well as the lens array 54) is not limited to the type in which the LDs are disposed in a single row but they may be disposed in a plurality of rows also in the transporting direction; for example, the LDs may be disposed in the densest state or a grid state as, for example, in the above-described multiple-lens 22 whereupon grooves may be formed more densely.

Figure 19:
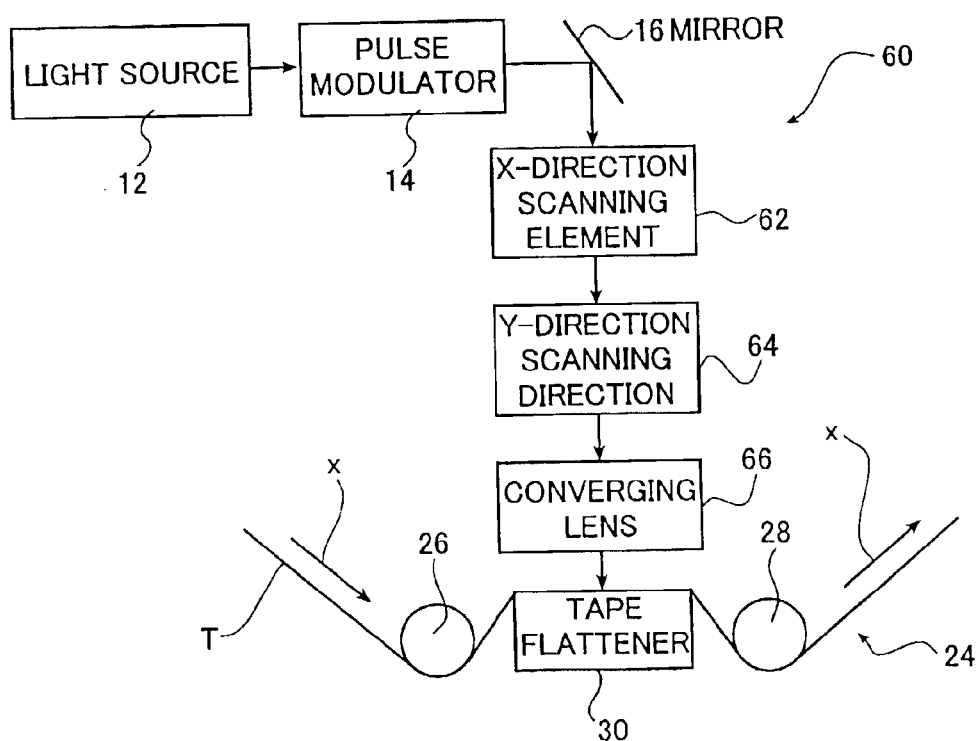
FIG. 19 is a conceptual diagram of another embodiment of a manufacturing apparatus of the present invention.

FIG. 19 shows a schematic view of a manufacturing apparatus for forming the grooves (line segments) extending at an angle with respect to the longitudinal direction as shown in FIG. 1B. Note that, since the embodiment shown in FIG. 19 has many components which are common to those of the manufacturing apparatus 10 shown in FIG. 3, the same components are denoted by the same numerals and only different components will be mainly described.

The manufacturing apparatus 60 shown in FIG. 19 comprises a light source 12, a pulse modulator 14, a mirror 16, an x-direction scanning element 62, a y-direction scanning element 64, a converging lens 66 and a transportation device 24.

That is, the manufacturing apparatus 60 has the x-direction scanning element 62, the y-direction scanning element 64 and the converging lens 66 disposed therein in place of the beam expander 18, the forming device 20 and the multiple-lens 22 of the manufacturing apparatus 10; therefore, the laser beam emitted from the light source 12 is subjected to pulse modulation by the pulse modulator 14 when necessary, reflected by the mirror 16 and incident on the x-direction scanning element 62.

The x-direction scanning element 62 is a light scanning element for deflecting and scanning a laser beam in the transporting direction x. On the other hand, the y-direction scanning element 64 is a light scanning element for deflecting the laser beam scanned with the x-direction scanning element 62 in the widthwise direction (hereinafter referred to as "y direction") perpendicular to the transporting direction x.

The manufacturing apparatus 60 of the illustrated embodiment scans the laser beam in an oblique direction by the provision of the light scanning elements for deflecting and scanning the laser beam in the directions which are orthogonal to each other.

Note that the light scanning elements are not particularly limited and various types of known deflectors, for example, galvanometer mirrors, polygon mirrors, AODs (acoustic optical deflectors) and the like can be used.

The laser beam deflected in the oblique direction is incident on the converging lens 66 such as an fθ lens or the like which has a sufficient area with respect to the region where the laser beam is deflected and scanned by the x-direction scanning element 62 and the y-direction scanning element 64 as well as has lens power (refractivity) in both the x- and y-directions, is incident on a predetermined scanning position corresponding to the processing position with a predetermined beam spot diameter and imaged thereon thereby forming a scanning line.

As described above, the tape T is transported by a transportation device 24 in the longitudinal direction while held in registry with the processing positions, with the magnetic recording layer thereof facing upstream of the light path of the laser beam. As a result, the grooves extending in an oblique direction as shown in FIG. 1B are continuously formed on the magnetic recording layer of the tape T whereby the tape T, on the magnetic recording layer of which a multiplicity of the grooves are formed in the oblique direction, can be manufactured by transporting the tape T in the longitudinal direction only once.

Moreover, angles of the grooves can by adjusted by adjusting the deflecting and scanning directions by respective scanning elements.

In the illustrated embodiment, the light scanning element is not limited to the type which has the light deflecting element that deflects the laser beam in both x- and y-directions, but another one which has only a light deflecting element that deflects the laser beam either in the y-direction or in the oblique direction may be permissible. As described above, since the tape T is transported in the longitudinal direction while being held in registry with the processing position, the scanning of the laser beam in the y-direction and the application thereof to the tape T result in an oblique scanning line formed on the tape T in view of the balance between the transporting speed of the tape T and the scanning speed of the laser beam whereby the groove extending in the oblique direction can be formed.

Moreover, the grooves as shown in FIG. 1B may be formed using a plurality of optical systems having the same scanning direction (for example, y-direction) and different moving directions of scanning (from right to left, from left to right and the like).

Furthermore, the laser beams are imaged in an oblique line in respect to the transporting direction of the tape T (namely, with the light path being in a sheet state) using an optical lens having a lens power in one direction or the like while the tape is transported; then grooves extending in an oblique direction may be processed by pulse-modulating the laser beams.

In a system performing recording/replaying in parallel with the longitudinal direction of the tape like a fixed head of multi-channel, it is important in the meaning of reduction in testing time to measure a dropout using the tape as short as possible for evaluating the system.

For this purpose, as shown in FIG. 20, the processed line segments (recesses) may be formed in a plurality of groups separated from each other in the widthwise direction in accordance with recording bands of the tape T (first group, second group, . . . , and Nth group) also in the present invention.

Moreover, in order to adequately perform calibration of the dropout testing apparatus and evaluation of the recording/replaying system of the magnetic tape, it is preferable that the processed line segments to be formed in the same group have a predetermined pattern which has been set group by group (for example, as illustrated in FIG. 20, those in the first group have a pattern of dotted lines, those in the second group have a pattern of chain lines, . . . , those in the Nth group have a pattern of chain double-dashed lines and the like). Furthermore, various types of dropout levels, track No., band No. and the like are preliminarily recorded as digital signals in different processed line segments so that dropout level in a designated track or band can immediately be obtained. By using the tape T as described above, when calibration of the dropout testing apparatus having a fixed head of multi-channel or evaluation of recording/replaying system of the magnetic tape is performed, individual testing operations in respect of a plurality of bands can be simultaneously executed in a short period of time. Particularly in an aspect in which different processed line segments have been formed within the same group, it is possible to simultaneously test a multiplicity of tracks on a band basis and, further, on a-track-in-a-band basis in a short period of time.

Moreover, by forming different patterns in the longitudinal direction of the tape T, it is possible to detect in which position a defect has occurred in the longitudinal and widthwise directions thereby determining the band (track) and the position in the longitudinal direction in which the defect exists.

The tape T which is previously divided into units of groups and then has a plurality of processed tracks corresponding to recording tracks in respective groups as described above can be formed by using a plurality of various types of processing apparatuses (manufacturing apparatuses) of the present invention as described above in respect to the widthwise direction of the tape T; and exemplified is a preferred processing apparatus described below.

Figure 21A:
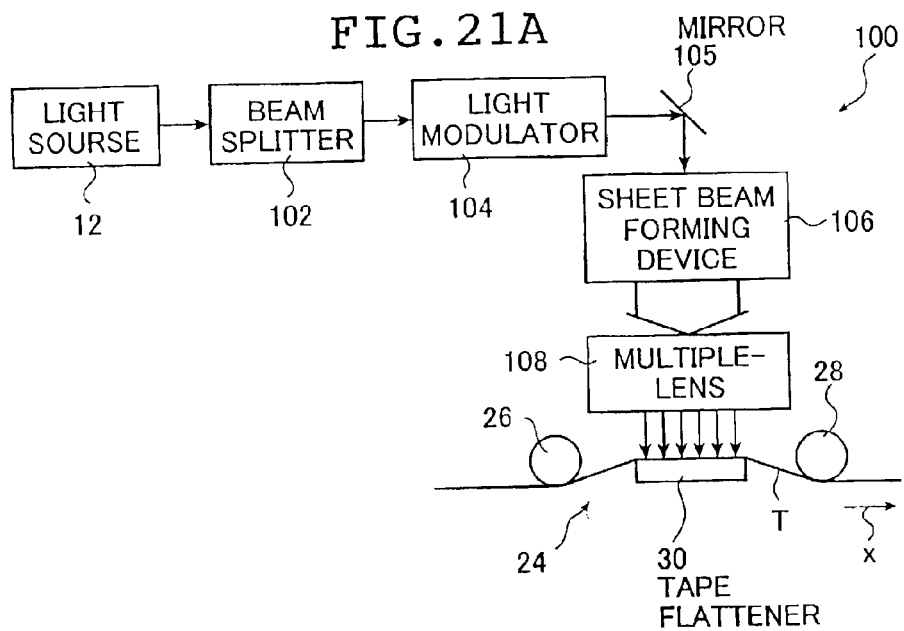
FIG. 21A is a conceptual diagram of another embodiment of a manufacturing apparatus of the present invention.

A processing apparatus 100 shown in FIG. 21A is a preferred embodiment for manufacturing the tape T in which respective processed line segments in a group are same with each other.

The illustrated processing apparatus 100 for forming, for example, the processed line segments in four groups corresponding to four recording bands fundamentally comprises a light source 12, a beam splitter 102, four light modulators 104 (namely, 104a, 104b, 104c and 104d), a mirror 105, a sheet beam forming device 106, a multiple-lens 108 and the transportation device 24. The transportation device 24 is similar to that in the embodiment described above so that the same components are denoted by the same numerals and those components will not be described.

The light source 12 is similar to that used in the processing apparatus 10 described above or the like.

Figure 21B:
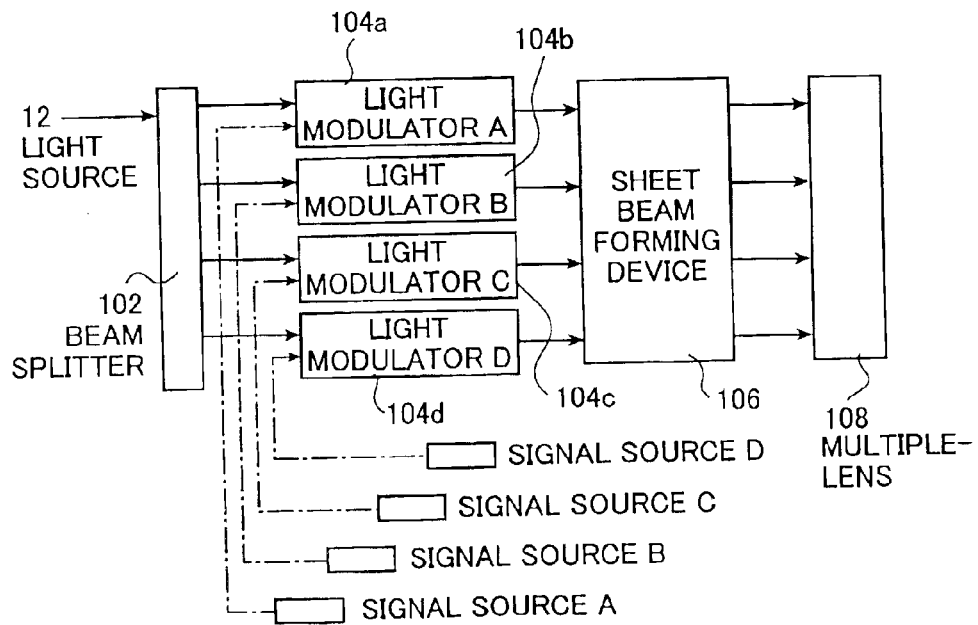
FIG. 21B is a conceptual diagram explaining the manufacturing apparatus shown in FIG. 21A.

The laser beam emitted from the light source 12, as shown in FIG. 21B is split into a plurality of laser beams (four in the illustration in FIG. 21B) by the beam splitter 102 corresponding to the widthwise direction of the tape T (therefore, in FIG. 21B, the tape T is transported in a direction nearly vertical to the plane of the sheet). The beam splitter 102 is not limited particularly, but various types of known beam splitters such as that using a dielectric multi-layer film or the like can be used.

Moreover, the beam profile forming device may be disposed upstream of the beam splitter 102, in order to allow intensities of respective laser beams which were split by the beam splitter to be uniform. The forming device to be disposed may be similar to the forming device 20 of the processing apparatus 10 shown in FIG. 3 described above.

Moreover, in the illustrated embodiment, processed line segments are formed into four groups by splitting the light beam by the beam splitter 102,; the present invention is not limited to this embodiment, but processed line segments may be formed into four groups by employing four light sources.

This aspect is applied similarly to various embodiments to be described below.

Respective laser beams split by the beam splitter 102 are incident on corresponding light modulators 104a, 104b, 104c and 104d and intensity-modulated (turning on and off of processing). Moreover, respective light modulators 104 (namely, 104a, 104b, 104c and 104d) are driven by corresponding signal sources (drivers) a, b, c and d.

The light modulator 104 is not limited particularly, but various types of known light modulators such as AOM or the like can be used.

Respective laser beams modulated by the light modulators 104 are reflected in a predetermined direction by the mirror 105 (not shown in FIG. 21B) and incident on a sheet beam forming device 106.

The sheet beam forming device 106 which is similar to the sheet beam forming device 70 shown in FIG. 9 changes respective laser beams split by the beam splitter 102 and then modulated by the light modulator 104 into linear laser beams which agree with an arrangement direction of the multiple-lens 108 (corresponding lens-array 110).

In the similar way to that in the illustrated embodiment shown in FIG. 9, a beam expander for collimating the laser beams may be disposed upstream of the sheet beam forming device 106.

The laser beams which have been changed into linear laser beams are incident on the multiple-lens 108.

Figure 22:
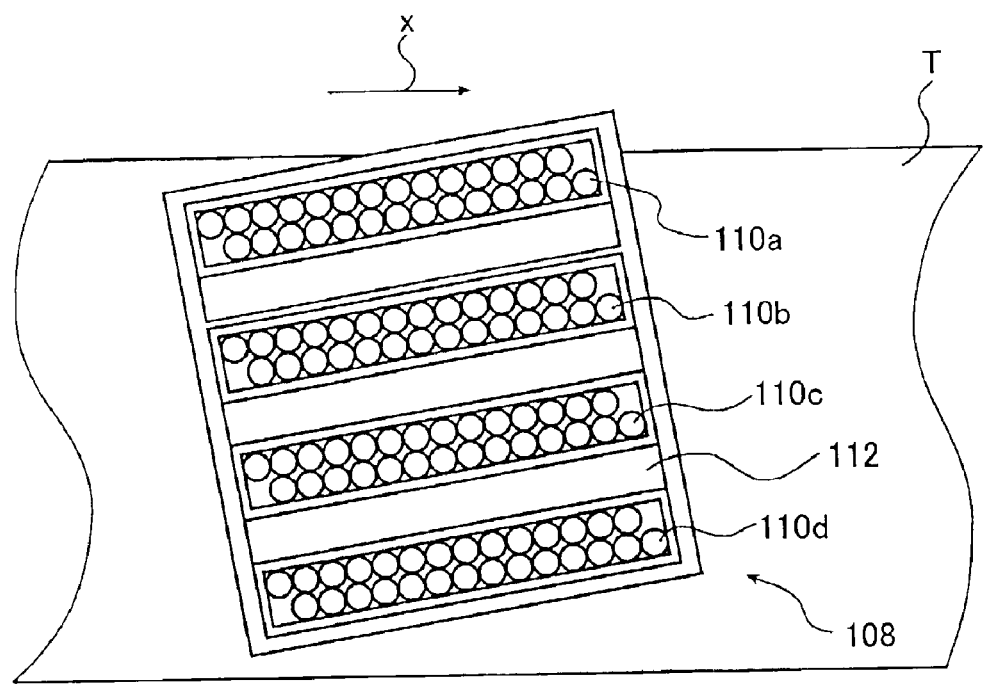
FIG. 22 is a conceptual view of a multiple-lens of the manufacturing apparatus shown in FIGS. 21A and 21B.

As shown in FIG. 22, the multiple-lens 108 is arranged in such a way that lens-arrays 110 (namely, 110a, 110b, 110c and 110d) having respective dummy lens-arrays similarly as in the multiple-lens 74 shown in FIG. 9 are disposed via spacers 112 in a direction perpendicular to the direction of the lens-arrays 110. Moreover, respective lens-arrays 110 may have lumination adjusting devices in a similar way to that in the embodiment shown in FIG. 9.

As shown in FIG. 22, the multiple-lens 108 as described above is arranged in such a way that the lens-arrays 110 may have an angle to some extent in respect to the transporting direction of the tape T. Moreover, this angle is set such that respective lens-arrays 110 (lines crossing the light axes of respective lenses of the lens-arrays 110) are not overlapped with each other in the transporting direction of the tape T.

Therefore, four linear laser beams which have been incident on corresponding lens arrays 110 are split and imaged on the different positions from each other in the widthwise direction of the tape T whereupon they are separated into four blocks and form a plurality of processed line segments in each of the thus separated blocks (14 line segments in one block in the illustrated embodiment).

As described above, respective laser beams are subjected to intensity modulation by the light modulators 104 and can form various types of patterns of the processed line segments by turning the processing of the tape T on and off in accordance with this modulation.

Therefore, in the illustrated processing apparatus 100, respective signal sources for driving the light modulators 104 supply driving signals which have different duties or on/off frequencies from each other to corresponding light modulators 104 whereby respective laser beams split by the beam splitter 102 are individually subjected to intensity modulation to form processed line segments having different patterns on a block basis.

Moreover, by changing the modulation patterns formed by the light modulators 104, the processed line segments which are different from each other in the longitudinal direction of the tape T can be formed (this aspect is applied similarly to an embodiment to be described below).

Figure 23A:
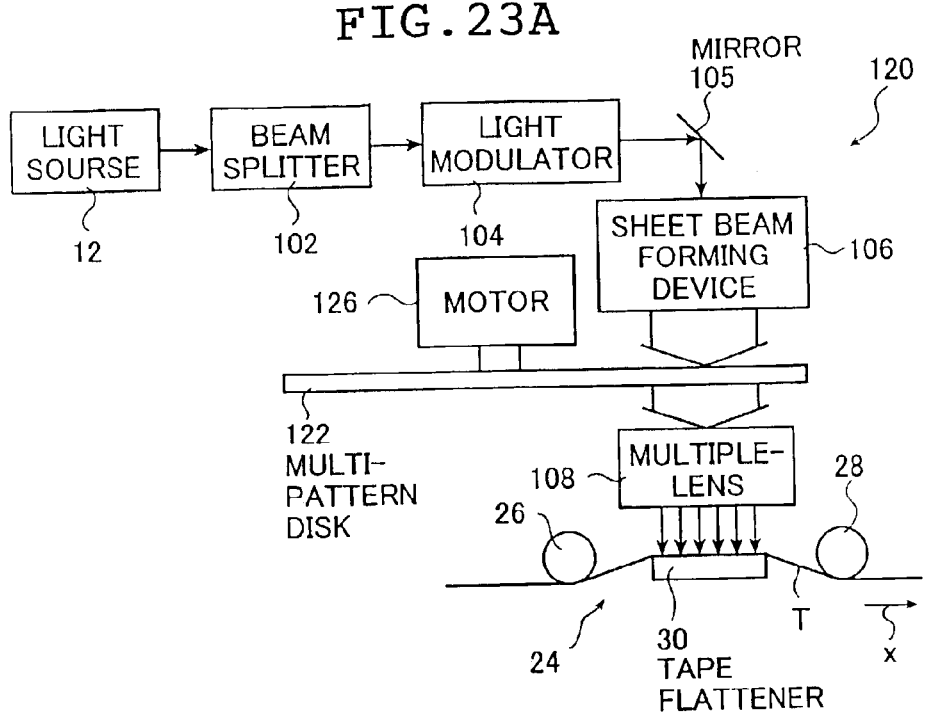
FIG. 23A is a conceptual diagram of another embodiment of a manufacturing apparatus of the present invention.

The processing apparatus 100 shown in FIG. 21A is a preferred embodiment for forming the tape T in which processed line segments in one block are same with each other; however, FIG. 23A conceptually shows a preferred embodiment for forming the tape T in which the processed line segments are different from each other in one block.

Moreover, the processing apparatus 120 shown in FIG. 23A has about the same construction as that of the processing apparatus 100 shown in FIG. 21A so that the same components are denoted by the same numerals and only different components will be mainly described below.

Figure 23B:
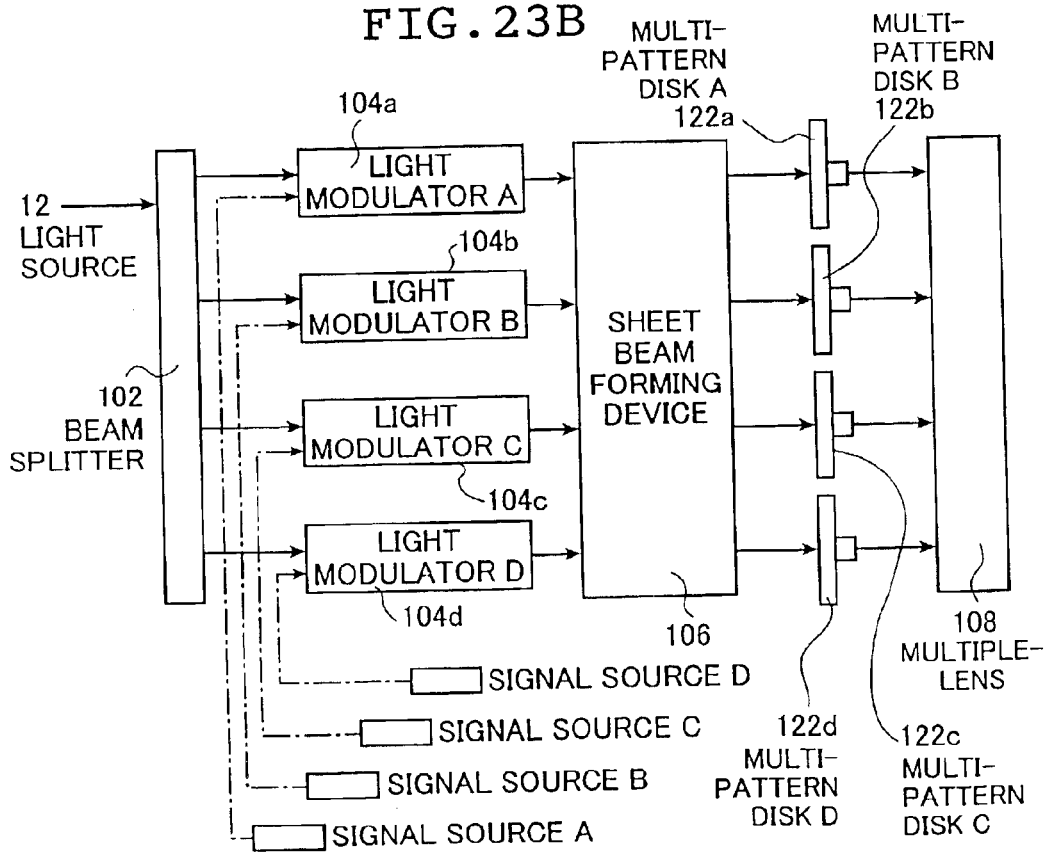
FIG. 23B is a conceptual diagram explaining the manufacturing apparatus shown in FIG. 23A.

The processing apparatus 120 shown in FIGS. 23A and 23B also for forming processed line segments in four groups fundamentally comprises a light source 12, a beam splitter 102, four light modulators 104 (namely, 104a, 104b, 104c and 104d), a mirror 105, a sheet beam forming device 106, four multi-pattern disks 122 (namely, 122a, 122b, 122c and 122d), a multiple-lens 108 and a transportation device 24, as shown in FIG. 23A.

As it is apparent from the above-description, the processing apparatus 120 shown in FIGS. 23A and 23B fundamentally has the same construction as that of the above-described processing apparatus 100 except for having multi-pattern disks 122 between the sheet beam forming device 106 and the multiple-lens 108.

Therefore, as shown in FIG. 23B, the laser beam emitted from the light source 12, is split into four laser beams nearly in the widthwise direction of the tape T by the beam splitter 102; respective laser beams thus formed are modulated by corresponding light modulators 104, reflected in the predetermined direction by the mirror 105 (not shown in FIG. 23B) and changed into linear laser beams in the predetermined direction by the sheet beam forming device 106; respective linear laser beams thus formed pass through corresponding multi-pattern disks 122, are incident on corresponding lens-arrays 110, incident on the tape T and imaged thereon to process the tape T.

Figure 24:
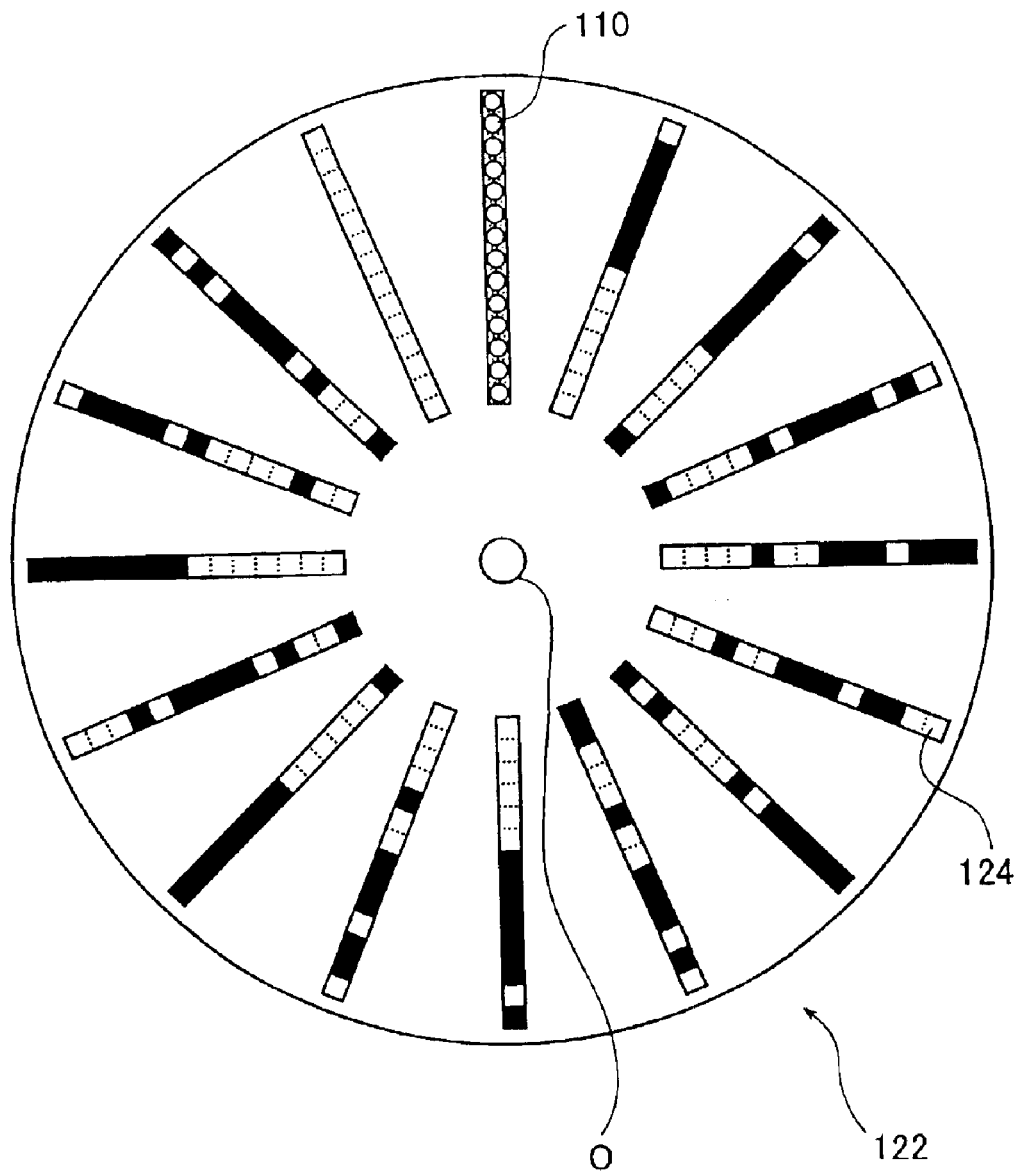
FIG. 24 is a conceptual view of an embodiment of a multi-pattern disk of the manufacturing apparatus shown in FIG. 23.

FIG. 24 is an elevational view of an embodiment of a multi-pattern disk 122.

The multi-pattern disk 122 is a shading disk in which a plurality of slits 124 (in the illustration, 16 slits spaced apart from each other with the same angle) radiating from the center are formed. In the present embodiment, the multi-pattern disk 122 is disposed such that the slits 124 are in agreement with the lens-arrays 110 and is rotated about the center 0 of the disk as an axis by the motor 126 at a high speed.

Therefore, the linear laser beams perform processing on the tape T by passing through the multi-pattern disk 122 only when the slit 124 and the lens-array 110 are in agreement with each other; namely, in the present embodiment, processing is turned on and off also by the rotation of the multi-pattern disk 122 in addition to the light modulator 104.

In this case, as shown in dotted lines in FIG. 24, the slits 124 are divided corresponding to respective lenses of the lens-array 110 (therefore, 14 sections in the illustration); each section arbitrarily performs masking to shade light. As an embodiment, the illustration shows that sections which are daubed in black are masked.

As described above, passage of the laser beams, namely, processing of the tape T is turned on and off also by the rotation of the multi-pattern disk 122. Therefore, by changing the masking patterns of the sections corresponding to respective lenses of the lens-arrays 110, patterns of the laser beams which are incident on respective lenses can be changed whereupon a plurality of different processed line segments from each other in each block can be formed.

In the illustrated processing apparatus 120, rotation speed of the multi-pattern disk 122 is not limited particularly, but it may appropriately determined in accordance with the processing pattern to be aimed at, the transportation speed of the tape T at the time of processing or the like and, preferably, is between 6000 rpm and 12000 rpm.

Moreover, the rotation speed of the multi-pattern disk 122 may be constant or changed either periodically or at random; hence, the forming pattern of the processed line segments may be changed in the longitudinal direction of the tape T by adjusting the rotation speed.

Figure 25:
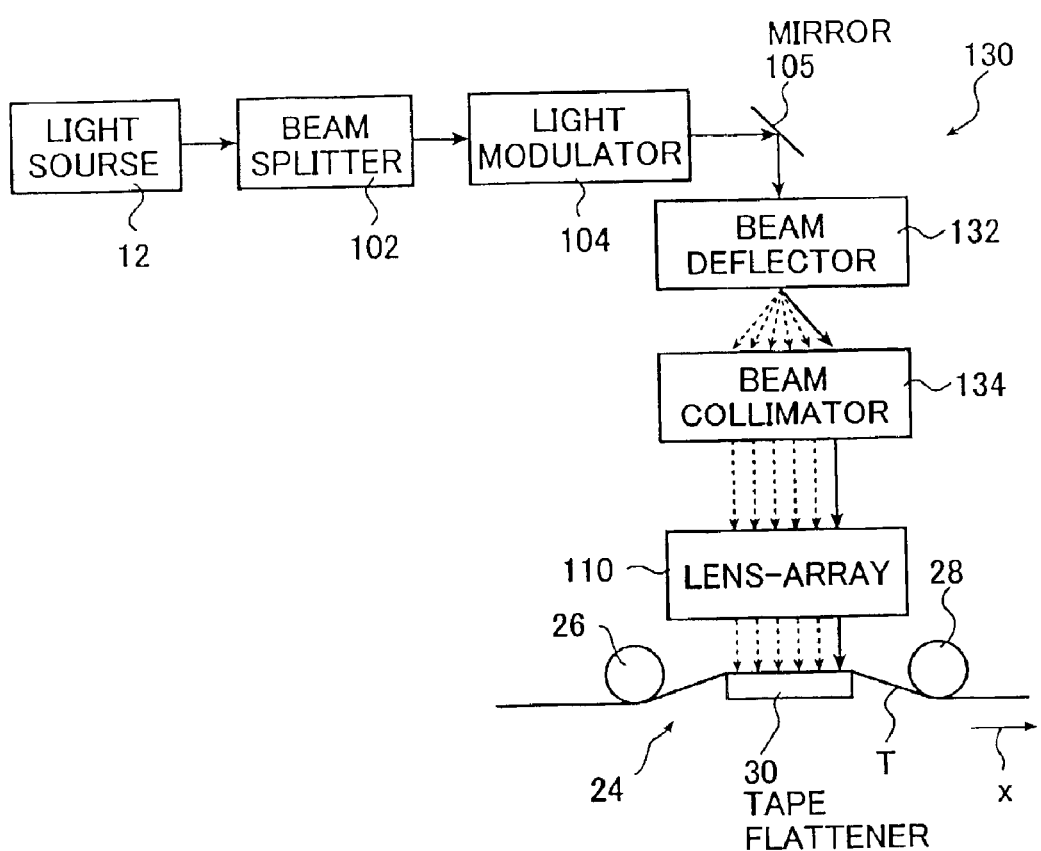
FIG. 25 is a conceptual diagram of another embodiment of a manufacturing apparatus of the present invention.

FIG. 25 conceptually shows another preferred embodiment of a processing apparatus for forming the tape T with different processed line segments from each other even in one block.

Note that, since the processing apparatus 130 shown in FIG. 25 uses a multiplicity of components similar to those of the processing apparatus 100 shown in FIG. 21A, the same components are denoted by the same numerals and only different components will be mainly described.

The processing apparatus 130 shown in FIG. 25 also for forming processed line segments in four groups fundamentally comprises a light source 12, a beam splitter 102, four light modulators 104 (namely, 104a, 104b, 104c and 104d), a mirror 105, four beam deflectors 132 (namely, 132a, 132b, 132c and 132d), four beam collimators 134 (namely, 134a, 134b, 134c and 134d), four lens-arrays 110 (namely, 110a, 110b, 110c and 110d) and a transportation device 24.

Also in the processing apparatus 130, operations from the light source 12 to the mirror 105 are similar to those in the embodiments described above.

Figure 26:
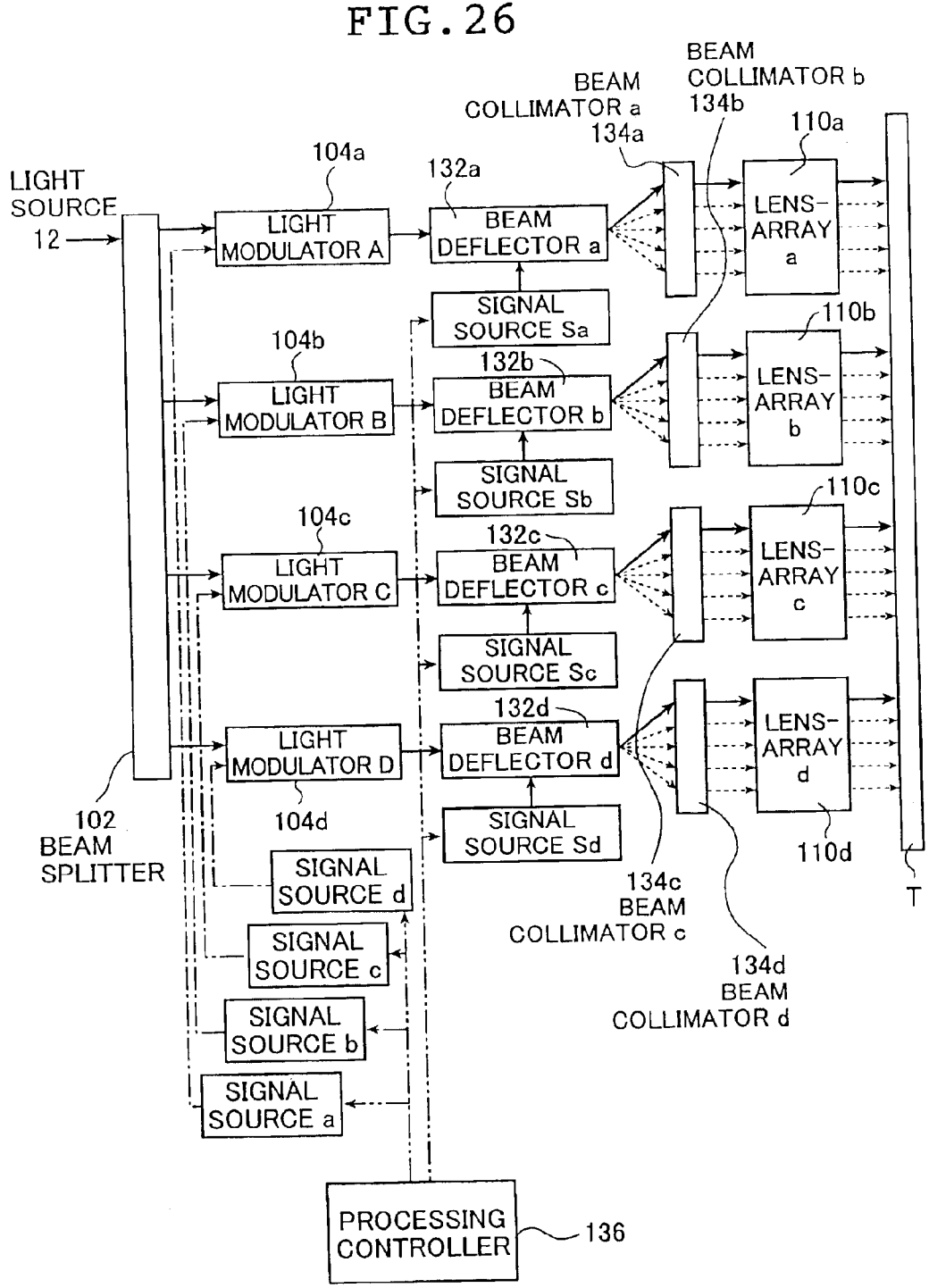
FIG. 26 is a conceptual diagram explaining the manufacturing apparatus shown in FIG. 25.

Namely, as shown in FIG. 26, the laser beam emitted from the light source 12 is split into a plurality of laser beams (four beams in the illustration) in the widthwise direction of the tape T by the beam splitter 102; and the thus generated plurality of laser beams are modulated by corresponding light modulators 104 and reflected to a predetermined direction by the mirror 105 (not shown in FIG. 26). Respective laser beams thus reflected by the mirror 105 are incident on corresponding beam deflectors 132. The beam deflectors 132 (namely, 132a, 132b, 132c and 132d) are each a light deflector which deflects and scans the laser beam modulated by the light modulator 104 in the direction of the lens alignment of corresponding lens-array 110.

In this case, in the illustrated embodiment, the beam deflector 132 is a light deflector which has a scanning speed of around 50 kHz to 500 kHz of frequencies and can change the scanning speed thereof in a time-series manner; for example, an AOM is preferably used.

The beam deflectors 132 are driven by corresponding signal sources S (namely, Sa to Sd) and changes the scanning speed by controlling driving signals from the signal sources.

The laser beams deflected in the directions of the lens alignments of the lens-arrays 110 by the beam deflectors 132 are incident on corresponding beam collimators 134 (namely, 134a, 134b, 134c and 134d), changed to beam lasers in parallel to the lens axes of the lens-arrays 110, incident on corresponding lens-arrays 110, scan them and are imaged on the tape T to process the tape T.

Moreover, as the beam collimator, various types of known devices such as of a combination of ordinary coaxial spherical system lenses, Galilei type, Kepler type or the like can be used.

In this case, as described above, the beam deflector 132 is a light deflector in which the scanning speed is variable in a time-series manner so that periods of scanning time of the laser beams in respective lenses of the lens-arrays 110, namely, periods of time during which the laser beams are incident to respective lenses of the lens-arrays 110 can be changed on a lens basis. Moreover, the laser beams are subjected to intensity modulation by the light modulators 104 whereupon turning on and off of processing can be controlled.

Therefore, by a synergistic effect derived from adjusting the modulation frequency of the light modulator 104 and scanning speed of the beam deflector 132 through controlling the signal sources of both light modulator 104 and beam deflector 132 by a processing controller 136, the number of processing points on a basis of respective lenses of the lens-array 110 can be changed whereupon the processed line segments in one block can be made to be different from each other.

Processing of the tape T described above according to the present invention may be processed at any step on a magnetic tape manufacturing process so long as it is processed after the magnetic recording layer has been formed. For example, the tape T may be processed before it is cut to a product width by a slitter or after it has been cut thereby.

While the evaluation reference tape, the method and apparatus for manufacturing the evaluation reference tape of the present invention have been described above in detail, the present invention is by no means limited to the above-described embodiments and it goes without saying that various improvements and modifications can be made within the range which does not depart from the gist of the invention.

As described above in detail, the evaluation reference tape according to the present invention has a recess on the magnetic recording layer thereof so that, by using the recess, without destroying the evaluation reference tape, sensitivity correction of the dropout testing apparatus or evaluation of magnetic recording/replaying system of the magnetic tape can be performed in accordance with depth or size of a defect of the tape. Therefore, performance of the dropout testing apparatus is appropriately comprehended and more adequate dropout testing which absorbs differences of individual apparatuses and changes along the passage of time is performed so that a better quality control of the magnetic tape can be performed. Moreover, performance of recording/replying system of the magnetic tape is comprehended quantitatively so that a adequate evaluation of the magnetic recording/replaying system can be performed.

Furthermore, according to the manufacturing method and manufacturing apparatus of the present invention, the evaluation reference tape having such excellent characteristics can efficiently be manufactured.

What is claimed is:

1. An apparatus for manufacturing an evaluation reference tape, comprising:
   at least one light source for emitting at least one of a laser beam in a visible region and a laser beam in an ultraviolet region;
   an optical system which allows the laser beam emitted from said at least one light source to be incident on a predetermined processing position;
   a transportation device for transporting a magnetic tape having a base layer and a magnetic recording layer formed on one of both surfaces of said base layer in a longitudinal direction with said magnetic recording layer facing upstream of a light path of said laser beam while it is held in registry with said predetermined processing position; and
   a device for securing flatness of the magnetic tape when it is transported by said transportation device while it is held in registry with said predetermined processing position.

* * * * *